(12) United States Patent
Dhananjay et al.

(10) Patent No.: US 11,641,222 B2
(45) Date of Patent: May 2, 2023

(54) SYSTEM AND METHOD FOR EMULATION OF WIRELESS CHANNELS AND MULTI-ANTENNA TRANSMIT AND RECEIVE CIRCUITS

(71) Applicant: NEW YORK UNIVERSITY, New York, NY (US)

(72) Inventors: Aditya Dhananjay, Brooklyn, NY (US); Sundeep Rangan, Jersey City, NJ (US); Dennis Shasha, New York, NY (US)

(73) Assignee: NEW YORK UNIVERSITY, New York, NY (US)

( * ) Notice: Subject to any disclaimer, the term of this patent is extended or adjusted under 35 U.S.C. 154(b) by 1333 days.

(21) Appl. No.: 15/778,540

(22) PCT Filed: Nov. 23, 2016

(86) PCT No.: PCT/US2016/063569
§ 371 (c)(1),
(2) Date: May 23, 2018

(87) PCT Pub. No.: WO2017/091713
PCT Pub. Date: Jun. 1, 2017

(65) Prior Publication Data
US 2022/0029667 A1 Jan. 27, 2022

Related U.S. Application Data

(60) Provisional application No. 62/260,077, filed on Nov. 25, 2015.

(51) Int. Cl.
*H04B 17/318* (2015.01)
*H04B 17/391* (2015.01)
(Continued)

(52) U.S. Cl.
CPC ......... *H04B 7/0426* (2013.01); *H04B 7/0617* (2013.01); *H04B 7/10* (2013.01);
(Continued)

(58) Field of Classification Search
CPC ............... H04B 7/0426; H04B 17/318; H04B 17/3912; H04B 7/0617; H04B 7/10; H04B 17/0087; H04L 25/0212
See application file for complete search history.

(56) References Cited

U.S. PATENT DOCUMENTS 6,922,395 B1 * 7/2005 Elliott .................... H04L 43/00
370/241
2009/0094492 A1 4/2009 Music et al.
(Continued)

FOREIGN PATENT DOCUMENTS

EP 2330843 A1 8/2011

OTHER PUBLICATIONS

International Search Report for International Appication No. PCT/US2016/06359 dated Jan. 31, 2017.
(Continued)

*Primary Examiner* — Janice N Tieu
(74) *Attorney, Agent, or Firm* — Hunton Andrews Kurth LLP

(57) ABSTRACT

Device and method can be provided for emulating a system which includes a wireless channel, a wireless transmitter, and a wireless receiver. For example, with an emulation processor, it is possible to receive baseband data, process the received baseband data, and transmit the processed baseband data. Further, with a controller, it is possible to receive configuration information pertaining to the wireless channel, the wireless transmitter, and the wireless receiver to be emulated; and configure the emulation processor according to the received configuration information.

20 Claims, 17 Drawing Sheets

(51) Int. Cl.
  *H04B 7/0426* (2017.01)
  *H04B 7/06* (2006.01)
  *H04B 7/10* (2017.01)
  *H04B 17/00* (2015.01)
  *H04L 25/02* (2006.01)

(52) U.S. Cl.
  CPC ....... *H04B 17/0087* (2013.01); *H04B 17/318* (2015.01); *H04B 17/3912* (2015.01); *H04L 25/0212* (2013.01)

(56) References Cited

U.S. PATENT DOCUMENTS

| | | | |
|---|---|---|---|
| 2011/0084887 A1* | 4/2011 | Mow | G01R 29/10 343/703 |
| 2013/0006601 A1 | 1/2013 | Mlinarsky et al. | |
| 2013/0301454 A1 | 11/2013 | Seol et al. | |
| 2015/0092824 A1 | 4/2015 | Wicker, Jr. et al. | |
| 2015/0215053 A1* | 7/2015 | Kyosti | H04W 24/06 455/67.16 |
| 2016/0212641 A1* | 7/2016 | Kong | H04B 17/0087 |

OTHER PUBLICATIONS

International Written Opinion for International Appication No. PCT/US2016/06359 dated Jan. 31, 2017.
Extended European Search Report dated Jun. 19, 2019 for European Patent No. 16869261.4.

\* cited by examiner

Note: *m*-ary signals are shown with dotted lines, and scalar signals are shown with solid lines.

SYSTEM AND METHOD FOR EMULATION OF WIRELESS CHANNELS AND MULTI-ANTENNA TRANSMIT AND RECEIVE CIRCUITS

CROSS-REFERENCE TO RELATED APPLICATION(S)

This application relates to, and claims the benefit and priority from International Patent Application No. PCT/US2016/063569 filed on Nov. 23, 2016 that published as International Patent Publication No. WO 2017/091713 on Jun. 1, 2017, which claims the benefit and priority from U.S. Provisional Patent Application No. 62/260,077, filed on Nov. 25, 2015, the entire disclosures of which are incorporated herein by reference in their entireties.

FIELD OF THE DISCLOSURE

The present application relates generally to the field of wireless communication systems, and more specifically to systems and method for emulating channels and radio frequency (RF) transmit and receive circuitry that can improve the efficiency of testing, eliminate the need for multiple cables, and allow new RF front-end designs to be easily built.

BACKGROUND INFORMATION

An explosion in the number of wireless broadband users has led to a severe spectrum shortage in the conventional cellular bands. The demand for cellular data services is expected to grow at a rapid rate, necessitating orders of magnitude increases in wireless capacity. Millimeter wave (mmW) frequencies at, for example, 28, 38, 57-63, 71-76, and 81-86 GHz have been attracting growing attention as a possible candidate for next-generation microcellular networks due to the availability of unused spectrum. Exemplary embodiments of such mmW systems can be based on orthogonal frequency division multiplexing (OFDM) technology that is known to persons skilled in the art.

However, currently available mmW devices principally use highly directional horn antennas to enable short-range, line-of-sight links, within a controlled and immobile environment, such as in a data center. Since such an environment and conditions are very difficult—if not impossible—to achieve in a practical system implementation, there is a need for building mmW systems "in the wild," e.g., where line-of-sight is not always available, SNRs are lower, mobility is the norm, and the use of static directional antennas may be difficult or infeasible.

Accordingly, mmW systems and devices can be expected to utilize a variety of multi-antenna technology (e.g., antenna arrays) at the transmitter, the receiver, or both. Currently, arrays used in base stations and mobile stations for transmission and/or reception of cellular-band (e.g., 1-2 GHz) signals are limited to a few elements, e.g., two to six. However, the small wavelengths of the mmW bands, combined with advances in radio-frequency (RF) electronics, have enabled mmW arrays containing a large number of antenna elements to be fabricated at costs suitable for large-volume consumer devices. Certain exemplary mmW array designs envision 16 to 64 antenna elements in both a fixed device (e.g., access point or base station) and in a mobile or portable device (e.g., smartphone or tablet).

Multi-antenna technology can be used to improve various aspects of a communication system, including system capacity (e.g., more users per unit bandwidth per unit area), coverage (e.g., larger area for given bandwidth and number of users), and increased per-user data rate (e.g., for a given bandwidth and area). Directional communications using multiple antenna can also ensure better wireless links as a mobile or fixed devices experience a time-varying channel. However, directional communications can also be achieved using a single antenna having a higher gain in a particular direction (e.g., range of azimuth and/or elevation) than in other directions.

For example, multiple antennas at the transmitter and/or the receiver can be used to shape or "form" the overall antenna beam (e.g., transmit and/or receive beam, respectively) in a particular way, with the general goal being to improve the received signal-to-interference-plus-noise ratio (SINR) and, ultimately, system capacity and/or coverage. This can be accomplished, for example, by maximizing the overall antenna gain in the direction of the target receiver or transmitter or by suppressing specific dominant interfering signals. In general, beamforming can increase the signal strength at the receiver in proportion to the number of transmit antennas. Beamforming can be based either on high or low fading correlation between the antennas. High mutual antenna correlation can typically result from a small distance between antennas in an array. In such exemplary conditions, beamforming can boost the received signal strength but does not provide any protection against radio channel fading, because such an arrangement does not provide diversity. On the other hand, low mutual antenna correlation typically can result from either a sufficiently large inter-antenna spacing or different polarization directions in the array. If some knowledge of the downlink channels of the different transmit antennas (e.g., the relative channel phases) is available at the transmitter, multiple transmit antennas with low mutual correlation can both provide diversity, and also shape the antenna beam in the direction of the target receiver and/or transmitter.

By way of further example, multiple antennas at one or both of the transmitter and the receiver can improve the SINR and/or achieve additional diversity/protection against fading compared to only multiple receive antennas or multiple transmit antennas. This can be useful in relatively poor channels that are limited, for example, by interference and/or noise (e.g., high user load or near cell edge). In relatively good channel conditions, however, the capacity of the channel becomes saturated such that further improving the SINR provides limited increases in capacity. In such exemplary cases, using multiple antennas at both the transmitter and receiver can be used to create multiple parallel communication "channels" over the radio interface. This can facilitate a highly efficient utilization of both the available transmit power and the available bandwidth resulting in, e.g., very high data rates within a limited bandwidth without a disproportionate degradation in coverage. For example, under certain exemplary conditions, the channel capacity can increase linearly with the number of antennas and avoid saturation in the data capacity and/or rates. These techniques are commonly referred to as "spatial multiplexing" or multiple-input, multiple-output (MIMO) antenna processing.

One of the biggest challenges in designing and building such multi-antenna devices and systems can be that they must be thoroughly tested for reliability, functionality, and/or performance during design (e.g., in a laboratory) and/or manufacturing. For example, testing wireless devices can be challenging due to the unique characteristics and vagaries of the wireless channel. A channel emulator is a device that re-creates the physical channel between the TX and RX devices for different geographical conditions, under various mobility, weather, and fading scenarios. It can be a staple part of any laboratory or factory where wireless devices are designed and/or tested. Typically, the TX and RX devices under test (DUTs) are connected to the channel emulator using cables that carry the RF signals. The wireless devices can then be tested based on the channel emulated wireless channel.

However, there are many reasons why the existing architecture for channel emulators is undesirable when the number of antennas is large, such as in mmW devices. Further, this existing architecture for channel emulation assumes that the TX and RX DUTs are completely built, including the entire RF front-end. Existing channel emulators make it hard to experiment with new designs for the RF front-end, without first fabricating them on to silicon, often at great cost.

Accordingly, there can be a need to address at least some of the inadequacies, issues, and/or concerns with existing channel emulator devices and techniques described above.

SUMMARY OF EXEMPLARY EMBODIMENTS

Accordingly, to address at least some of such issues and/or problems, certain exemplary embodiments of methods, systems, devices, and computer-readable media of the present disclosure can utilize techniques to emulate a wireless system comprising a wireless channel and portions of a wireless transmitter and a wireless receiver, such as one or more single antennas and/or antenna arrays. Such exemplary embodiments of methods, systems, devices, and computer-readable media of the present disclosure can vastly outperform conventional methods, techniques, and systems in various known applications, including exemplary applications discussed herein.

Some exemplary embodiments comprise device and method for emulating a system which includes a wireless channel, a wireless transmitter, and a wireless receiver. For example, with an emulation processor, it is possible to receive baseband data, process the received baseband data, and transmit the processed baseband data. Further, with a controller, it is possible to receive configuration information pertaining to the wireless channel, the wireless transmitter, and the wireless receiver to be emulated; and configure the emulation processor according to the received configuration information. In some exemplary embodiments, the controller is further configured to receive at least one portion of the configuration information pertaining to the wireless transmitter and the wireless receiver from one or more devices under test (DUTs). In some exemplary embodiments, the configuration information pertaining to the wireless transmitter and/or the wireless receiver relates to at least one of analog beamforming, digital beamforming, or hybrid beamforming.

In some exemplary embodiments, the emulation processor is further configured to process the received baseband data according to configuration information comprising first parameters relating to the wireless channel and second parameters relating to a plurality of antennas comprising at least one of the wireless transmitter or the wireless receiver. In some exemplary embodiments, the emulation processor comprises a plurality of programmable finite impulse response (FIR) filters. In some exemplary embodiments, the controller is configured to program the plurality of programmable FIR filters based on one or more spatial signatures relating to a plurality of paths comprising the wireless channel and one or more beamforming matrices relating to at least one of the wireless transmitter or the wireless receiver. In some exemplary embodiments, the controller is configured to program the plurality of programmable FIR filters to emulate a multiple-input, multiple output (MIMO) channel for each of the plurality of paths comprising the wireless channel. In some exemplary embodiments, the controller is configured to program the plurality of programmable FIR filters to emulate a single-input, single-output (SISO) channel for each of the plurality of paths comprising the wireless channel.

In some exemplary embodiments, the controller is further configured to receive updated configuration information pertaining to at least one of the wireless channel, the wireless transmitter, and the wireless receiver; and configure the emulation processor to operate according to the received updated configuration without substantially affecting the substantially real-time operation. In some exemplary embodiments, the controller is configured to periodically receive the updated configuration and configure the emulation processor in response.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments, in which.

While the present disclosure will now be described in detail with reference to the figures, it is done so in connection with the illustrative embodiments and is not limited by the particular embodiments illustrated in the figure(s) or in the appended claims.

DETAILED DESCRIPTION OF EXEMPLARY EMBODIMENTS

Figure 1:
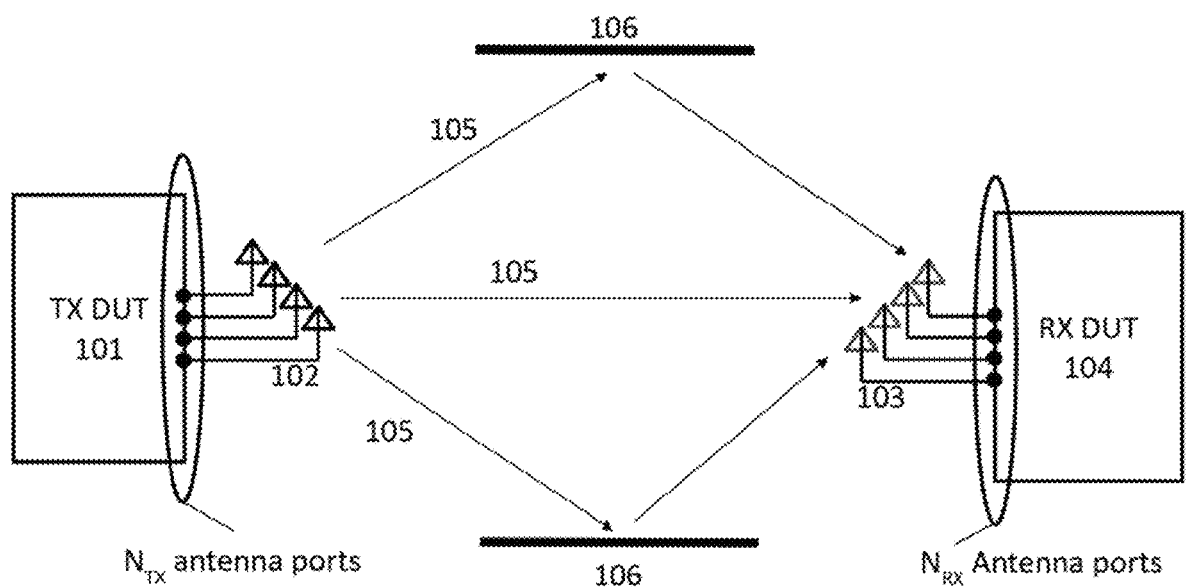
FIG. 1 is a diagram of a typical MIMO wireless communication link between a transmit (TX) device under test (DUI) and an receiver (RX) DUT.

FIG. 1 shows a diagram of an exemplary MIMO wireless communication link between a TX DUT (block 101) and an RX DUT (block 104). For example, the TX DUT has $N_{TX}$ antenna ports, which are connected to its antenna elements (block 102). Similarly, the RX DUT has $N_{RX}$ antenna ports, which are connected to its antenna elements (block 103). RF signals are carried between the antenna ports and the antenna elements. Between the TX and RX antennas, radio waves propagate along a plurality of paths (105), the paths having different path-gains, delays and angles of arrival and departure. These signals super-impose at the receiver to create multi-path interference. The particular set of paths is determined by the physical objects in the environment (106), and could change as a result of mobility of the TX, RX, or physical objects in the wireless environment. At the TX, each path can be mathematically represented by spatial signature, which is a vector of size $N_{TX}$. Similarly at the RX, each path has a spatial signature, which is a vector of size $N_{RX}$. One method to test the DUTs involves performing over-the-air (OTA) experiments in urban, semi-urban, and rural conditions, under different geographical, mobility, weather, and fading scenarios. Unfortunately, such testing is time-consuming, expensive, and is usually limited.

Figure 2A:
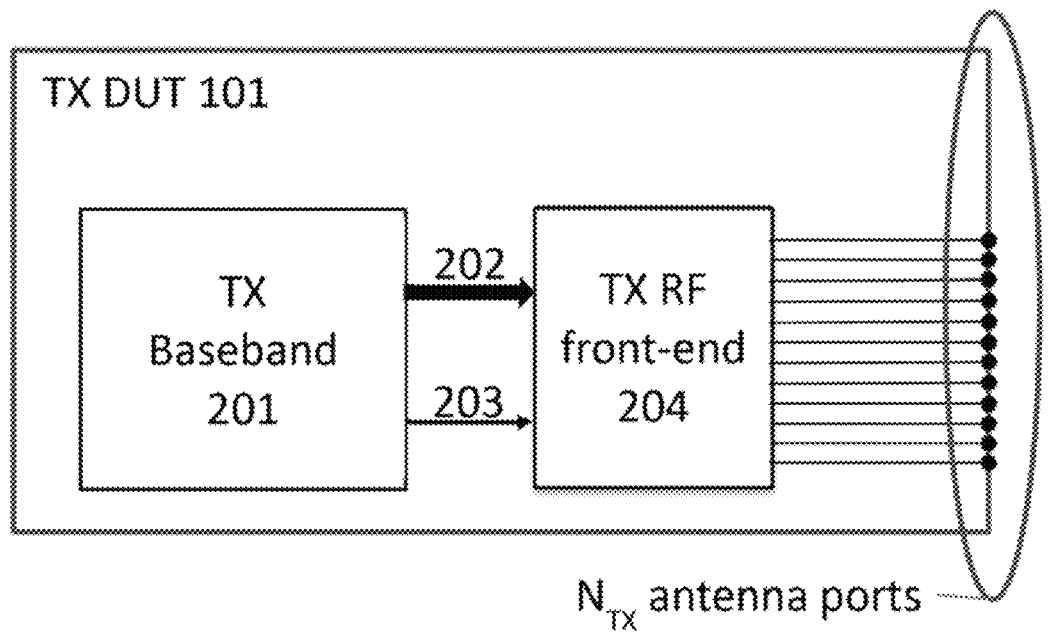
FIG. 2(a) is a diagram of an internal structure of an TX DUT according to an exemplary embodiment.

FIG. 2(a) shows a diagram of an internal structure of a TX DUT according to an exemplary embodiment, comprising the baseband processor (block 201) and the RF front-end (block 204). The interface between these two blocks 201, 204 can comprise two signals: baseband signal 202, and control signal 203. TX RF front-end 204 can perform a variety of functions, well-known in the art, including, e.g., beamforming, precoding, up-conversion, splitting, combining, amplification, duplexing, switching, etc. Different parts of the functionality can be performed in digital or analog, and the analog portions can be performed at baseband, intermediate frequency (IF) or at RF. The output of the TX RF front-end are the $N_{TX}$ antenna ports, which can then be connected to the actual antenna elements. Control signal 203 contains the attenuation and gain controls, directives on RF frequency to be used, etc.

Figure 2B:
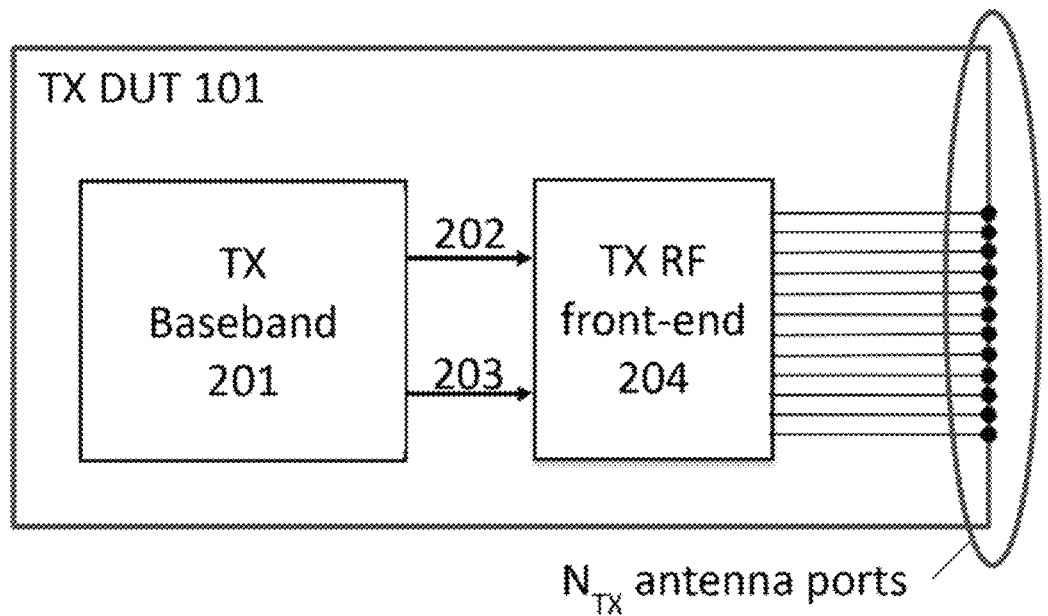
FIG. 2(b) is a diagram of a TX DUT that can employ analog beamforming according to an exemplary embodiment of the present disclosure.
Figure 2C:
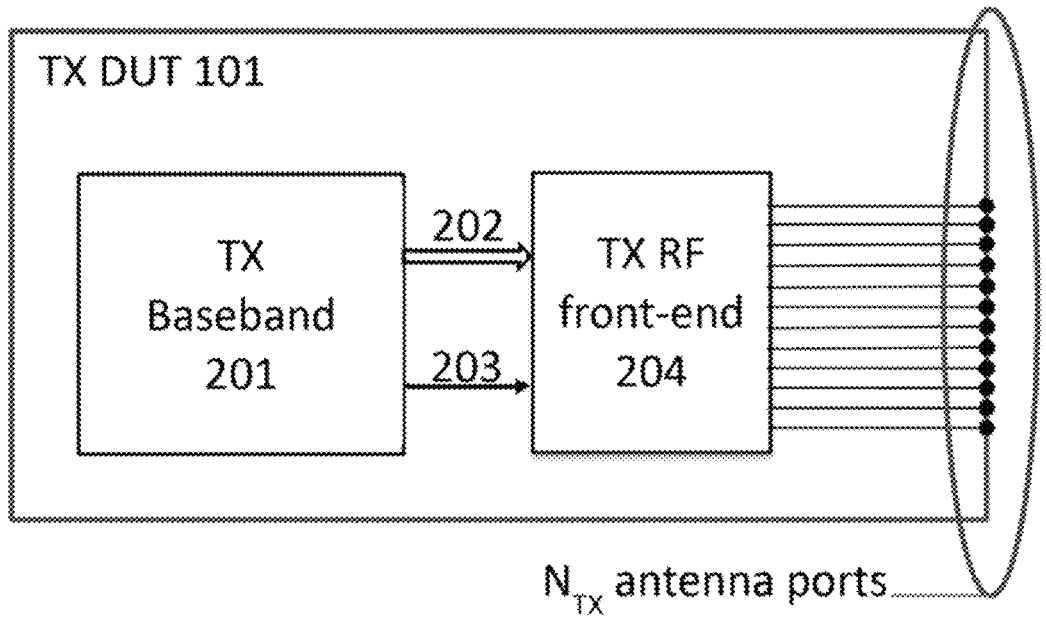
FIG. 2(c) is a diagram of a TX DUT that employs hybrid beamforming according to one or more exemplary embodiments of the present disclosure.
Figure 2D:
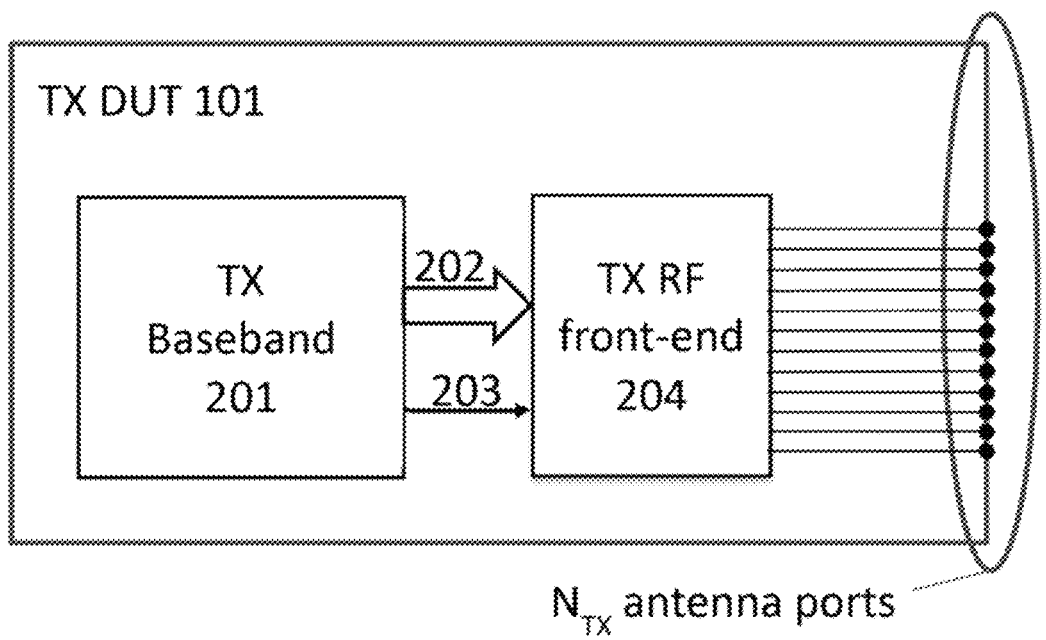
FIG. 2(d) is a diagram of a TX DUT that employs digital beamforming according to one or more exemplary embodiments of the present disclosure.

In various embodiments, there are three main modes of beamforming that can be performed at the TX DUT. FIG. 2(b) illustrates analog beamforming according to an exemplary embodiment, in which baseband signal 202 is a single, analog or digital data stream. For example signal 203 can comprise the beamforming vector (size $N_{TX}$), which dictates how the single stream 202 should be converted to the $N_{TX}$ parallel RF outputs. FIG. 2(c) illustrates a diagram of a hybrid beamforming according to an exemplary embodiment, in which signal 202 has m parallel streams of analog/digital baseband data, where m can be much smaller than $N_{TX}$. Signal 203 also can comprise a beamforming matrix of dimension ($N_{TX}$×m), which can specify how the m-ary stream 202 should be converted to the $N_{TX}$ parallel RF outputs. FIG. 2(d) illustrates a diagram of a digital beamforming according to an exemplary embodiment, in which signal 202 can comprise $N_{TX}$ parallel streams of analog/digital baseband data. Signal 203 can include no beamforming information, since the beamforming has already been done at TX baseband processor 201.

FIG. 3 shows a diagram of an internal structure of an RX DUT according to an exemplary embodiment, comprising the baseband processor (block 301) and the RF front-end (block 304). The interface between these two blocks 301, 304 can comprise two signals: the baseband signal 302 and the control signal 303. The RX RF front-end 304 can perform a variety of functions, well-known in the art, including, e.g., beamforming, precoding, decoding, down-conversion, splitting, combining, amplification, duplexing, switching, etc. Different parts of the functionality can be performed in digital or analog and the analog portions can be performed at baseband, IF, or RF. The input to the RX RF front-end are the $N_{RX}$ antenna ports, which in turn, can be connected to the actual antenna elements. Control signal 303 can include the attenuation and gain controls, directives on RF frequency to be used, etc.

Figure 3A:
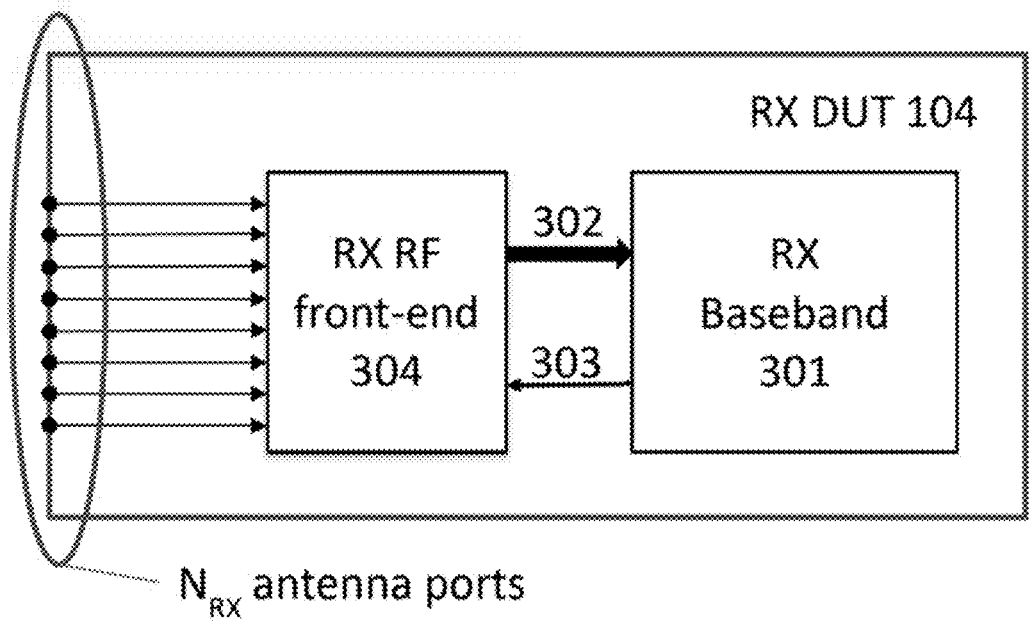
FIG. 3(a) is a diagram of an internal structure of an exemplary RX DUT according to one or more exemplary embodiments of the present disclosure.
Figure 3B:
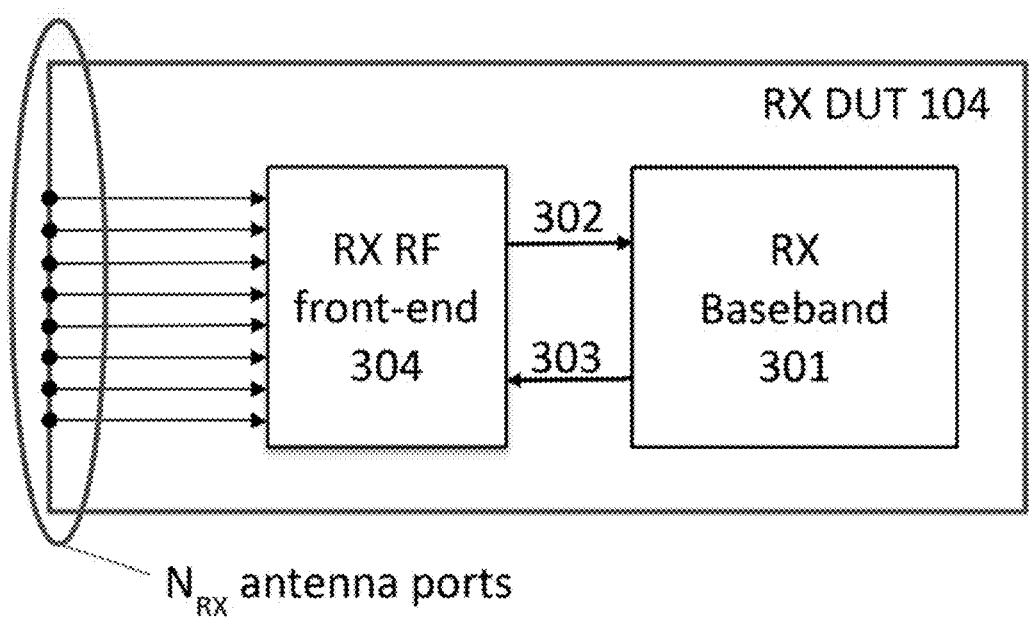
FIG. 3(b) is a diagram of a RX DUT that employs analog beamforming according to an exemplary embodiment.
Figure 3C:
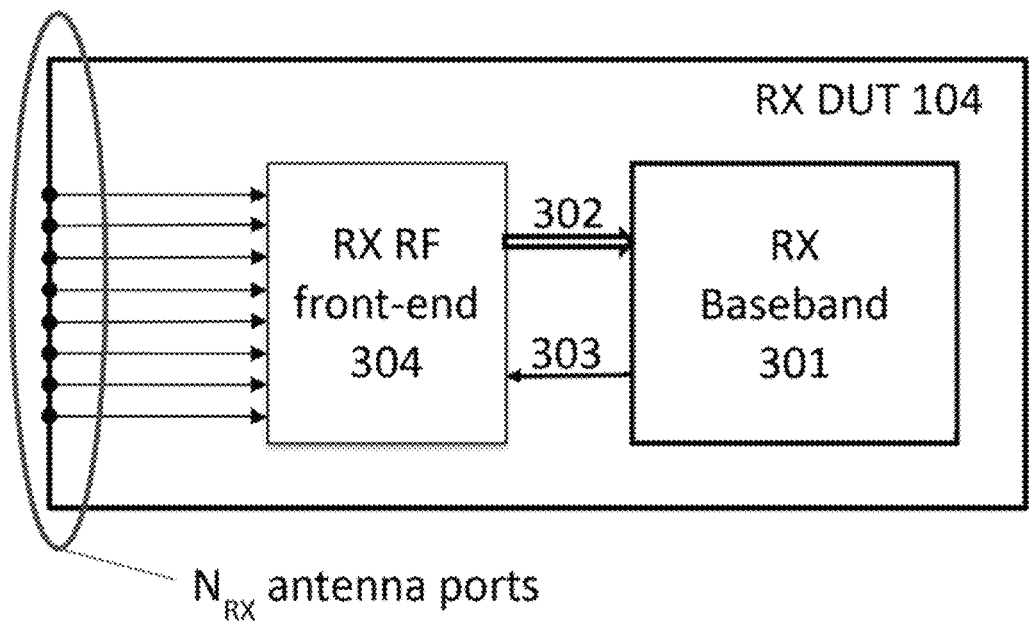
FIG. 3(c) is a diagram of a RX DUT that employs hybrid beamforming according to one or more exemplary embodiments of the present disclosure.
Figure 3D:
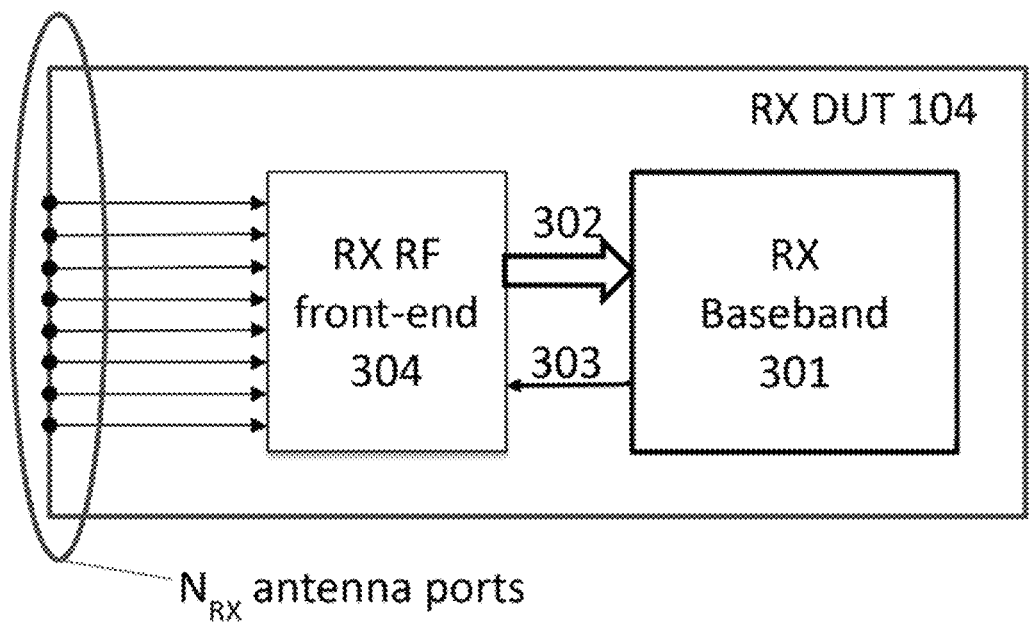
FIG. 3(d) is a diagram of a RX DUT that employs digital beamforming according to one or more exemplary embodiments of the present disclosure.

In various exemplary embodiments, there can be three main modes of beamforming that can be performed at the RX DUT. FIG. 3(b) illustrates a diagram of an analog beamforming configuration according to an exemplary embodiment, in which baseband signal 302 is a single, analog or digital data stream. Signal 303 can include the beamforming vector (size $N_{RX}$), which can specify how the $N_{RX}$ parallel RF inputs can be converted to the single stream 302. FIG. 3(c) illustrates a diagram of a hybrid beamforming configuration according to an exemplary embodiment, in which baseband signal 302 can comprise m parallel streams of analog/digital baseband data, where in can be much smaller than $N_{RX}$. Signal 303 can comprise a beamforming matrix of size ($N_{RX}$×m), which can specify how the $N_{RX}$ parallel RF inputs can be converted to the m-ary stream 302. FIG. 3(d) illustrates a diagram of a digital beamforming configuration according to an exemplary embodiment, in which baseband signal 302 can comprise $N_{RX}$ parallel streams of analog/digital baseband data. Signal 303 can include no beamforming information, since all the beamforming can be done at the RX baseband processor 301.

Figure 4A:
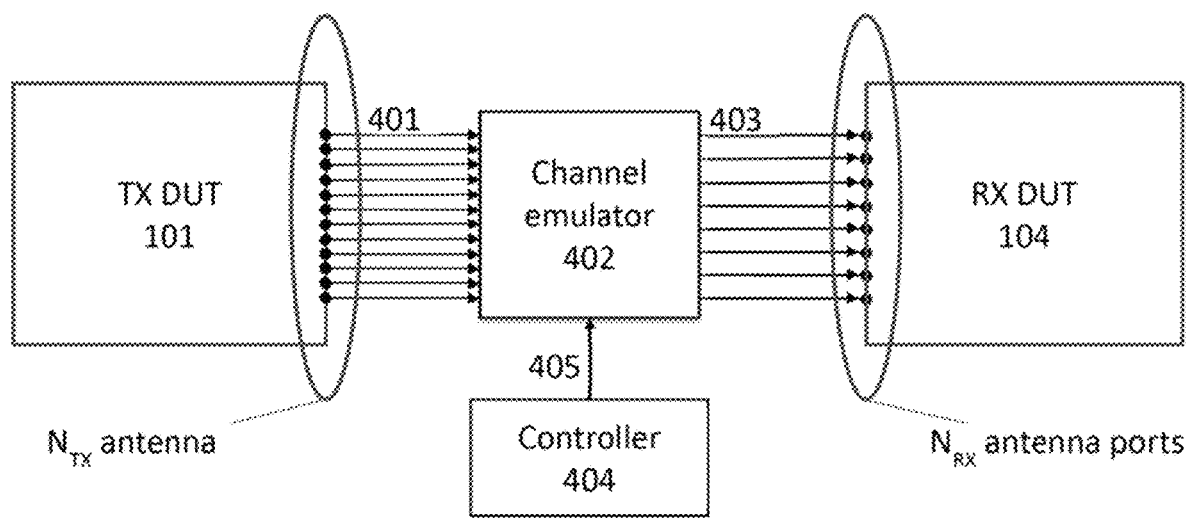
FIGS. 4(a)-(b) is a diagram of a MIMO channel emulation system according to one or more exemplary embodiments of the present disclosure.

FIG. 4(a) illustrates a diagram of an exemplary embodiment of a MIMO channel emulation system. For example, channel emulator 402 can provide a real-time, programmable simulation of a wireless channel between the TX and RX DUTs. As used herein, "real-time" refers generally to receiving and/or processing input data to provide output data at substantially the same rate as the environment (e.g., the TX and RX DUTs) provides the input data and/or consumes the output data, without significant delay. The antenna ports of the TX DUT (101) can connect with the channel emulator 402 using $N_{TX}$ parallel cables, which carry RF signal 401. Similarly, the antenna ports of the RX DUT (104) can connect to the channel emulator using $N_{RX}$ parallel cables, which carry RF signal 403. In contrast, if an over-the-air experiment were being conducted, the antenna ports on the TX and RX DUTs could be connected to the antenna elements instead of being connected to the emulator, as shown.

Channel emulator 402 can be programmed with the characteristics of the wireless channel, so that the DUTs can be tested under a variety of multipath, mobility, and fading scenarios. The emulator can be programmed by the controller (block 404) via signal 405. The use of channel emulation can facilitate testing these devices on a wide variety of channels with precise control. This exemplary architecture is also illustrated in FIG. 4(b), where the internal structure of the TX and RX DUTs is shown.

Figure 4B:
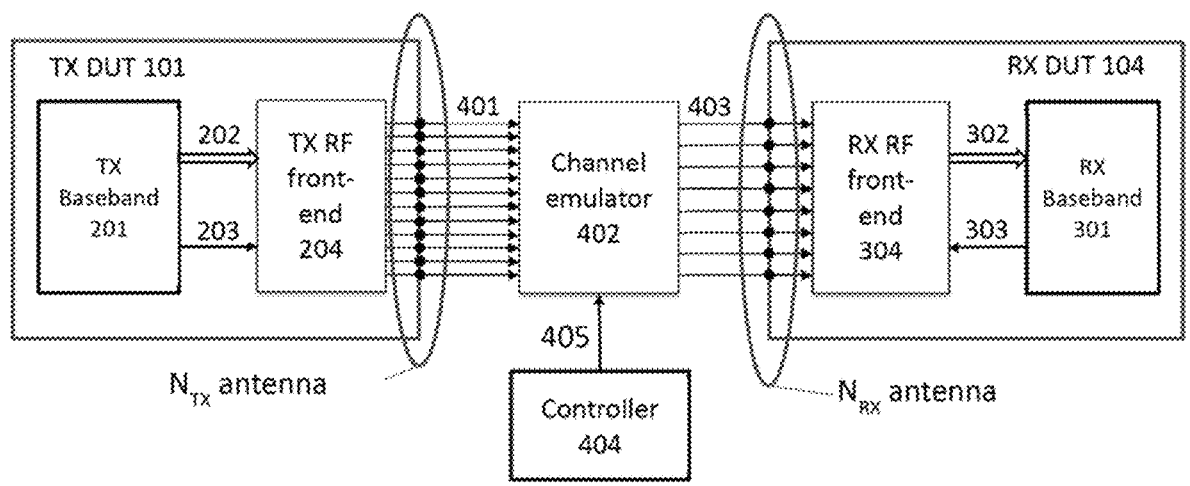

However, there are certain reasons why the channel emulation technique shown FIGS. 4(a) and 4(b) can be undesirable when the antenna arrays employed by the DUTs involve a large number of elements that operate in mmW bands. First, e.g., since the number of antennas can be large, it can be very difficult or infeasible to connect a large number of cables from the DUTs to the emulator. This can make it difficult or impossible to experiment with fully digital architectures. Second, the attenuation of the mmW signal in the cables is very high. Third, since signals 401 and 403 are analog RF, the emulator requires one RF chain for every antenna element, thereby making it very expensive to build. Fourth, unless all the cables have exactly the same length and exactly the same attenuation, the channel as seen by the DUTs can be different from the channel being emulated. Fifth, there can be a need, e.g., during a development stage, to experiment with antenna arrays having different number of antennas, different antenna placements, or different antenna polarizations. Fabricating an RF antenna array in silicon for each alternative is time-consuming and prohibitively expensive.

Exemplary embodiments of the present disclosure can solve these and other drawbacks, limitations, and insufficiencies by providing a device that can emulate TX antenna arrays (or single TX antenna), RX antenna arrays (or single RX antenna), and the wireless channel between the TX and RX antenna arrays. Such embodiments, which are also referred to herein as a wireless emulator, can provide the functionality of known channel emulators as well as the capability to emulate at least a portion of the functionality of the RF front-end of the DUTs. Such embodiments enable a baseband signal—rather than an RF signal—to be exchanged between the TX and RX DUTs.

Figure 5A:
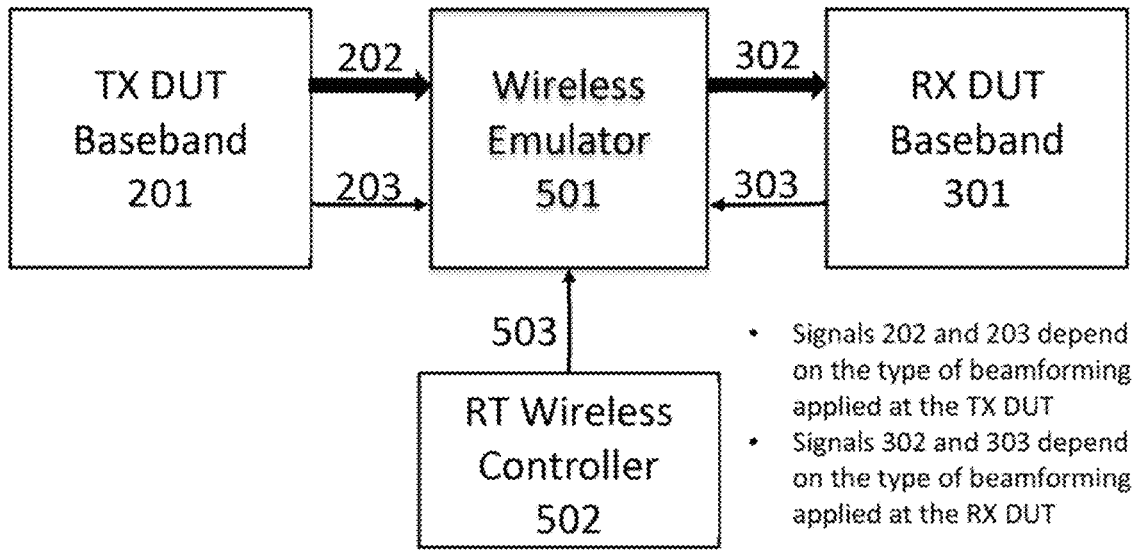
FIG. 5(a) is a block diagram of an exemplary wireless emulator according to one or more exemplary embodiments of the present disclosure.

FIG. 5(a) shows a diagram of an exemplary wireless emulator according to one or more exemplary embodiments of the present disclosure. The baseband component of the TX DUT (block 201) communicates directly with the wireless emulator (block 501). The interface between these two blocks can comprise the analog or digital baseband signal 202 and the control signal 203, such as described above in relation to the exemplary configuration shown in FIG. 2. This interface can be substantially identical to the interface between the baseband component of the TX DUT and the TX RF front-end (see FIG. 2), in order to allow the greatest ease of development and testing. A substantially identical interface enables the TX baseband processor to be attached to its RF front-end or to the emulator, without need for modification.

Similarly, the baseband component of the RX DUT (block 301) can be connected to the wireless emulator 501, and can communicate with it through analog or digital baseband signal 302 and control signal 303. This interface (signals 302 and 303) also can be made substantially identical to the interface between the baseband component of the RX DUT and the RX RF front-end. The content and/or form of signals carried in 202, 203, 302, and 303 can depend on the type of beamforming applied at the transmitter and receiver. Signal 203 can include the TX gain and attenuation control, along with the TX RF frequency to be used. Similarly, signal 303 can include the RX gain and attenuation control, along with the RX RF frequency to be used.

Real-time (RT) wireless controller 502 can communicate with wireless emulator 501 through signal 503, which can carry information about the number, placement, and polarization of the antennas. Further, signal 503 periodically can carry digital information including, but not limited to: a) the multipath profile of the channel, along with the spatial signature of the various paths; b) fading model; c) mobility pattern of the DUTs. For example, signal 503 can provide updated versions of such digital information on a regular periodic basis (e.g., every 1 ms) or on an as-needed basis (e.g., when currently-used information is insufficiently accurate due to passage of time, or in response to receiving updated information from an external source). When the emulator has received control signals 203, 303, and 503, its sub-component (called the Tap Calculator) can determine the appropriate set of finite-impulse-response (FIR) filter parameters and delay lines to be used in the actual emulation. Tap Calculator and other sub-components are described in more detail herein below. As such, the emulator can update these emulation parameters in real-time on a periodic or as-needed basis in response to signal 503, without interruption of the real-time processing. The exemplary wireless emulator shown in FIG. 5 can provide a very powerful mechanism to design and test various theoretical RF front-ends without the requirement to fabricate them physically, as well as enabling DUTs to be tested across a wide variety of emulated scenarios.

Figure 5B:
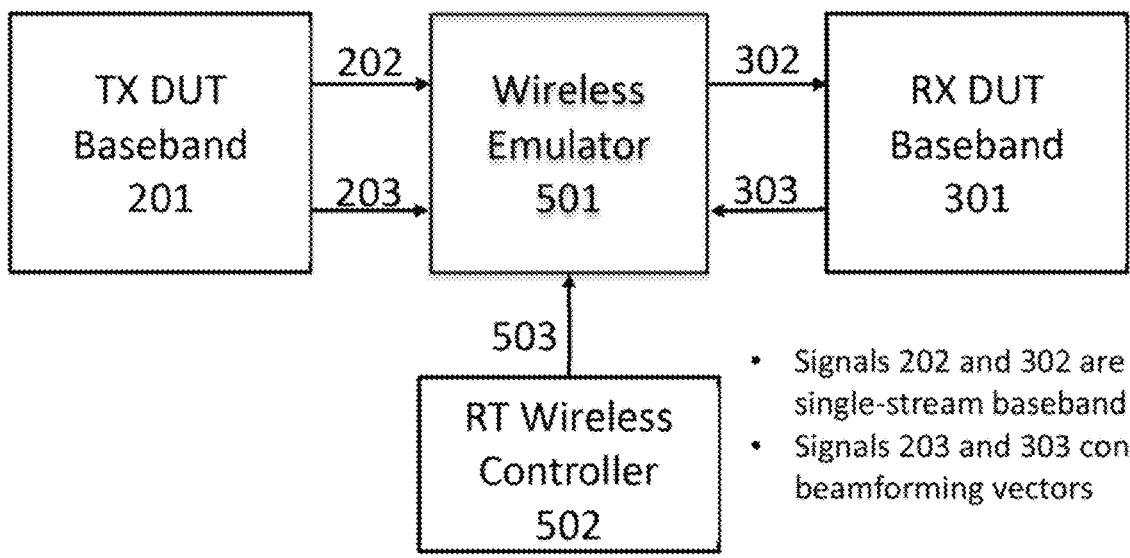
FIG. 5(b) is a block diagram of an exemplary wireless emulator employing analog beamforming, according to one or more exemplary embodiments of the present disclosure.
Figure 5C:
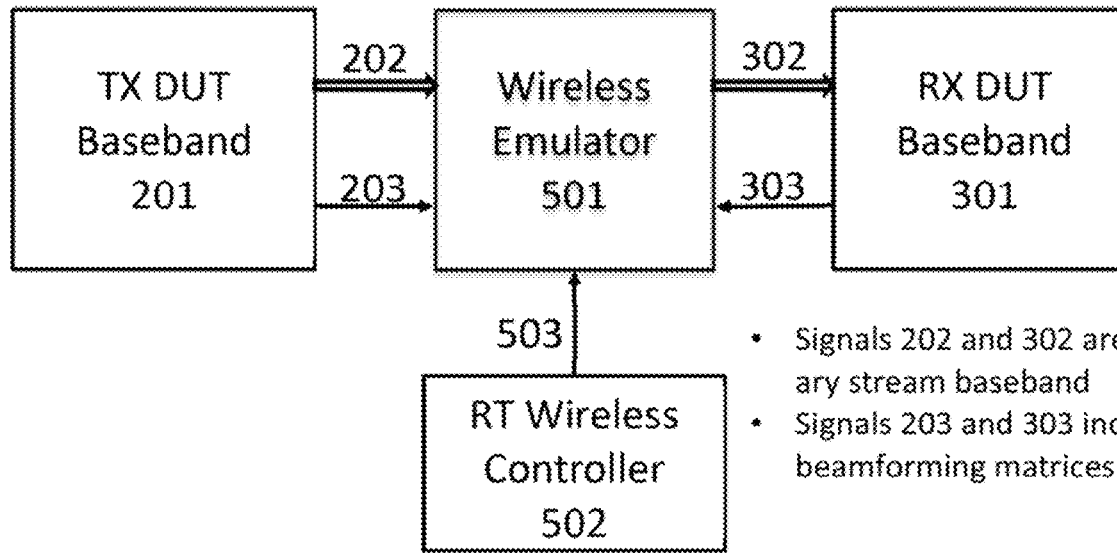
FIG. 5(c) is a block diagram of an exemplary wireless emulator employing hybrid beamforming, according to one or more exemplary embodiments of the present disclosure.
Figure 5D:
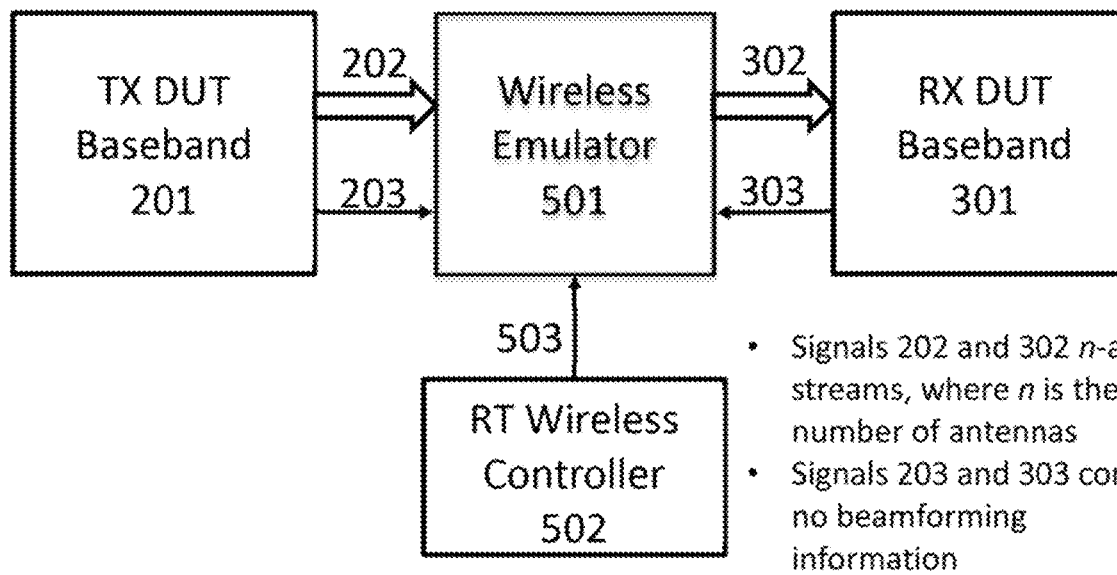
FIG. 5(d) shows a block diagram of an exemplary wireless emulator employing digital beamforming, according to one or more exemplary embodiments of the present disclosure.

In various exemplary embodiments, beamforming modes can be emulated individually for the TX and RX DUTs, such that the TX DUT can use a different beamforming mode from the RX DUT. The operation of the beam forming modes of the various embodiments are illustrated in FIGS. 5(b)-(d) and described in more detail below. FIG. 5(b) illustrates a diagram of an analog beamforming configuration according to an exemplary embodiment of the present disclosure, in which the TX baseband DUT sends a single data stream 202 (analog or digital) to the wireless emulator. The signal 203 can contain the TX beamforming vector of size $N_{TX}$. Symmetrically, signal 303 can carry the RX beamforming vector of size $N_{RX}$. When the wireless emulator has received the beamforming vectors (in signals 203 and 303) as well as information about the multi-path profile of the channel and spatial signatures of the various paths (from signal 503), its tap calculator can calculate an effective single-input, single-output (SISO) channel for each of the L paths in the profile. Each of these paths can therefore be emulated as a set of rank-1 taps with delays (e.g., SISO channels). The outputs corresponding to each of these paths can be added together to create single-stream output signal 302 (which can be analog or digital), which can be sent to the RX baseband DUT 301.

Skilled persons will readily comprehend that a directional antenna beam can be provided not only by analog beamforming using a phased array of antenna elements, but also by a single antenna with inherent directionality (e.g. a dish or horn antenna). Accordingly, emulation of "analog beamforming" at the TX and/or the RX can likewise include emulation of either a phased array or a single, directional antenna. In either case, the emulation can be performed based on information provided about the one or more antennas including, for example: gain pattern of individual antenna elements (e.g., relative to direction of maximum gain); placement of the antenna(s); and orientation of antenna(s) relative to a fixed reference (e.g., relative to line-of-sight direction to the other TX/RX device).

FIG. 5(c) illustrates a diagram of a hybrid beamforming configuration according to an exemplary embodiment of the present disclosure, in which in represents the number of spatial streams that are used. In this exemplary embodiment, the TX baseband DUT sends an m-ary data stream (analog or digital) 202 to the wireless emulator. The signal 203 can carry the TX beamforming matrix of size ($N_{TX} \times m$). Symmetrically, signal 303 can carry the RX beamforming matrix of size ($N_{RX} \times m$). Once the wireless emulator has received the beamforming matrices (in signals 203 and 303) as well as information about the multi-path profile of the channel and spatial signatures of the various paths (from signal 503), its tap calculator can determine an effective (m×m) MIMO channel for each of the L paths in the profile; this set of (m×m) MIMO channels are emulated by the emulator. The output of the emulation, corresponding to each path, is therefore an m-ary data stream. These outputs are finally added to create the m-ary analog or digital baseband signal 302 which is then sent to the RX baseband DUT 301.

FIG. 5(d) illustrates a diagram of a digital beamforming configuration according to an exemplary embodiment of the present disclosure, in which the TX baseband DUT sends an $N_{TX}$-ary digital data stream 202 to the wireless emulator. In the fully digital case, the beamforming is performed by the TX and RX DUTs; therefore, there is no beamforming information that the TX and RX DUTs need to communicate with the wireless emulator. Once the wireless emulator has received the information about the multi-path profile of the channel and the spatial signatures of the various paths (from signal 503), it calculates an effective ($N_{RX} \times N_{TX}$) MIMO channel for each of the L paths in the profile. Given that the input to the emulator is an $N_{TX}$-ary data stream, the output of the emulation, corresponding to each path, is therefore an $N_{RX}$-ary data stream. The outputs corresponding to each of the L paths are finally added to create the $N_{RX}$-ary digital signal 302, which is then sent to the RX baseband DUT 301. Since signal 202 and 302 have $N_{TX}$ and $N_{RX}$ streams respectively, the data exchanged in these signals can be quite large; therefore, it can be necessary and/or beneficial to transmit these streams at lower digital resolution. The design therefore allows for configurable data-widths to meet the bandwidth constraints of the system. Such configuration can be performed, for example, during the initialization stage.

DUTs can be connected to the wireless emulator in various ways. In one exemplary embodiment, the emulator and DUTs are implemented on separate machines (e.g., computers). Signal 203 and 303 can be simple digital communication lines, while signals 202 and 302 can be analog; carried on a pair of cables—one each for the in-phase and quadrature baseband components—for each of the spatial streams. For analog and hybrid beamforming embodiments, this would be 1 and m pairs of cables, respectively. While the above exemplary embodiment can be most suitable for analog and hybrid beamforming emulation, a second exemplary embodiment in which both the emulator and DUTs are implemented in a single machine (e.g., computer) can be more suitable for digital beamforming emulation due to the typically larger number of cables that would otherwise be required.

Figure 6A:
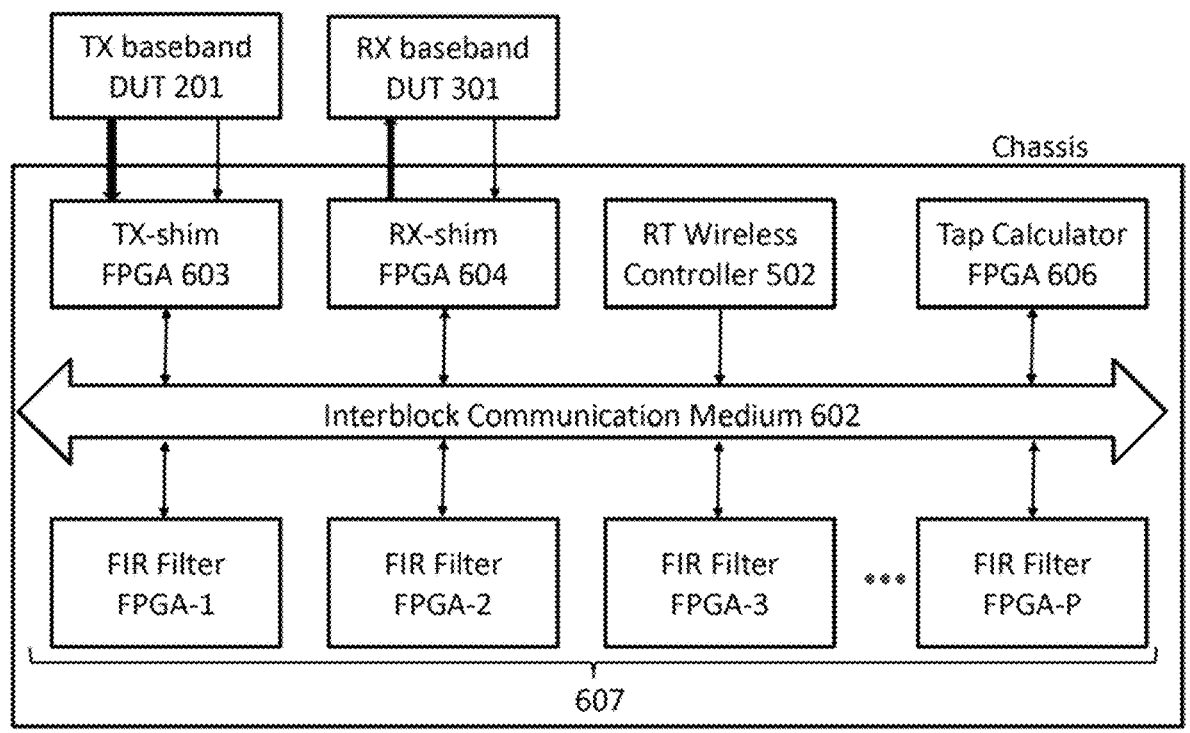
FIGS. 6(a) and 6(b) are block diagrams of an exemplary wireless emulator based on FPGAs, in which the TX and RX DUTs are external to the wireless emulator, according to one or more exemplary embodiments of the present disclosure.

In various exemplary embodiments, the wireless emulator can be implemented by using several types of hardware including (but not limited to): a) field programmable gate arrays (FPGAs); b) digital signal processors (DSPs); c) graphical processing units (GPUs); d) application specific integrated circuits (ASICs); e) general purpose central processing units (CPUs). FIG. 6(a) illustrates a diagram of an exemplary embodiment of the wireless emulator based on FPGAs, where the TX and RX DUTs are located external to the wireless emulator. Its various constituents are described below, and the data-flow between these components are illustrated in FIG. 6(b).

Figure 6B:
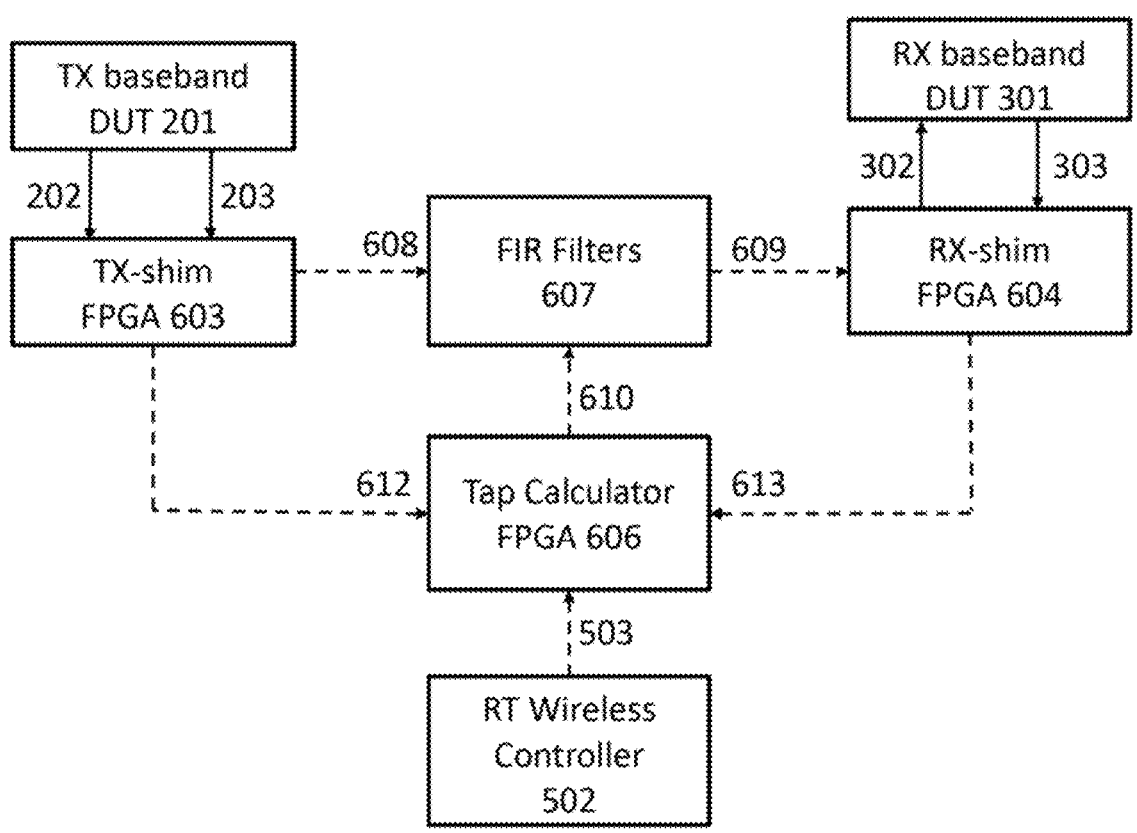

Chassis (block 601) can comprise various components that can be placed in the same physical chassis, or can be distributed across a small number of physical chassis. In either case, the various blocks can communicate via Inter-block Communication Medium 602. Exemplary embodiments of medium 602 can include PCI (Peripheral Component Interconnect), PCIe (PCI express), PXI (PCI extensions for instrumentation), PXIe (PXI express), or AXIe (Advanced TCA Extensions for Instrumentation and Test) backplanes. In the case where the components are distributed across multiple physical chassis, the chassis can be connected together to create a virtual PCI or PXI backplane. In an exemplary embodiment, medium 602 can be a PXI Back-Plane and Trigger Bus, whereby sinter-block communication can be performed using:

i) first-in first-out queues (FIFOs) that carry data from a fixed source block to a fixed destination block (these FIFOs are illustrated in FIG. 6(b)); and ii) triggers, which are synchronization signals that any block can send, and all blocks on the back-place will receive.

Skilled persons will readily comprehend that medium 602 can be any backplane or non-backplane technology, including direct digital cables that carry data between the respective blocks.

For example, TX-shim FPGA (603) can provide an interface between the TX baseband DUT (block 201) and the rest of the wireless emulator. Block 603 can receive the control signal 203 from the DUT, and send it to the tap-calculator (606) using a FIFO signal 612. The TX-shim 603 also can receive the analog baseband signal 202 from the DUT (using cables), digitize it, and send it to the appropriate finite impulse response (FIR) filter in block 607 using FIFO signal 608. The analog signal 202 can be a single stream (for analog beamforming) or an m-ary stream (for hybrid beamforming). This exemplary architecture (with the DUT located external to the wireless emulator) can be most suitable for analog and hybrid beamforming embodiments, in which the number of cables will be less than for digital beamforming embodiments.

Continuing with the description of FIGS. 6(a) and 6(b), RT Wireless Controller (502) block can be employed to set parameters such as the multipath profile of the channel, fading model, mobility model, etc. Specifically, information about the spatial signatures of the various paths in the channel along with the Doppler parameters can be periodically sent to the tap calculator 606 using the FIFO signal 611. This block can be physically placed either inside or outside of the box containing the rest of the emulator. If it is placed outside the box, it can communicate with the emulator using a standard digital communication line.

Likewise, Tap Calculator block (606) can receive the spatial signature of each of the paths and mobility (or Doppler) patterns from the RT wireless controller 502 via FIFO signal 503. Block 606 also can receive the beamforming vectors/matrices from the TX-shim 603 via signal 612, and from the RX-shim 604 via signal 613. The tap calculator 606 can combine these signals (as described later in the document) to get the effective SISO or MIMO channel function. This result, which can comprise tap weights and delays, can be provided (via FIFO 610) to the various FPGAs that run the finite-impulse-response (FIR) filters in block 607.

Finite impulse response (FIR) filters (block 607) can comprise or include the components that provide the emulated channel. As discussed above, the taps and delays are received from the tap calculator 606 via signal 610. Block 607 can receive the input digital baseband signal from the TX-shim 603 via signal 608, and can send the output digital baseband signal 609 to the RX-shim 604. The functionality can be split across several FPGA boards if the resources of a single FPGA cannot satisfy the required bandwidth requirements (and clock rate constraints) of the emulator.

RX-shim FPGA (block 604) can provide the interface between the RX baseband DUT (block 301) and the rest of the wireless emulator. Block 604 can receive the control signal 303 from the RX baseband DUT 301, and send it to the tap-calculator (606) using a FIFO signal 613. The RX-shim 604 also can receive the digital post-emulation baseband signal 609 from the FIR filters 607, convert it to analog, and send it to the RX baseband DUT via signal 302 using cables. In various embodiments, the analog signal 302 can be single stream (for analog beamforming) or an m-ary stream (for hybrid beamforming). As mentioned earlier, this architecture (with the DUT separate from wireless emulator) can be most appropriate for exemplary analog and hybrid beamforming embodiments.

Various other exemplary embodiments including various modifications of the exemplary architecture shown in FIGS. 6(a) and 6(b) can be implemented. For example, block 603 can be modified to receive signal 202 in various formats or ways: a) analog or digital; b) over baseband, IF, or RF; and c) in any of the three beamforming modes. In such embodiments, block 603 can first convert signal 202 to digital baseband, and then send it to the appropriate finite-impulse-response (FIR) filter 607 using FIFO signal 608, as previously described. By further example, block 604 can be modified to transmit signal 302 in various formats or ways: a) analog or digital; b) over baseband, IF, or RF; and c) in any of the three beamforming modes. In these cases, block 604 can first perform the appropriate conversion, and send the result to RX baseband DUT 301 via signal 302, as described above.

Figure 7A:
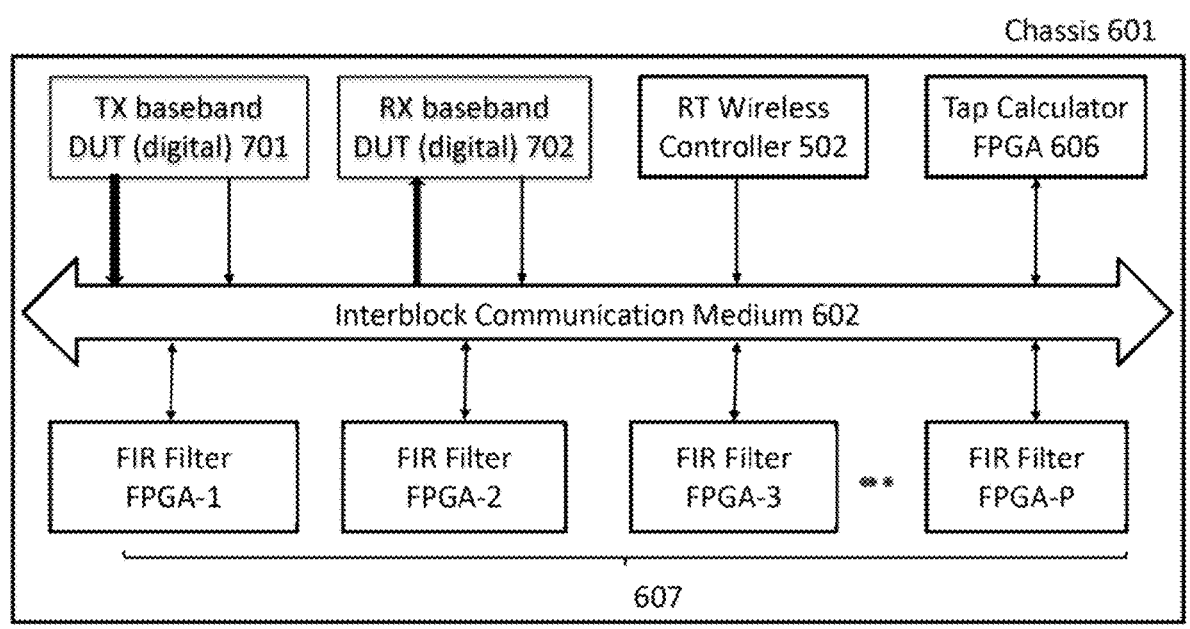
FIGS. 7(a) and 7(b) are block diagrams of exemplary wireless emulator based on FPGAs, in which the TX and RX DUTs are located in the same chassis as the wireless emulator, according to one or more exemplary embodiments of the present disclosure.
Figure 7B:
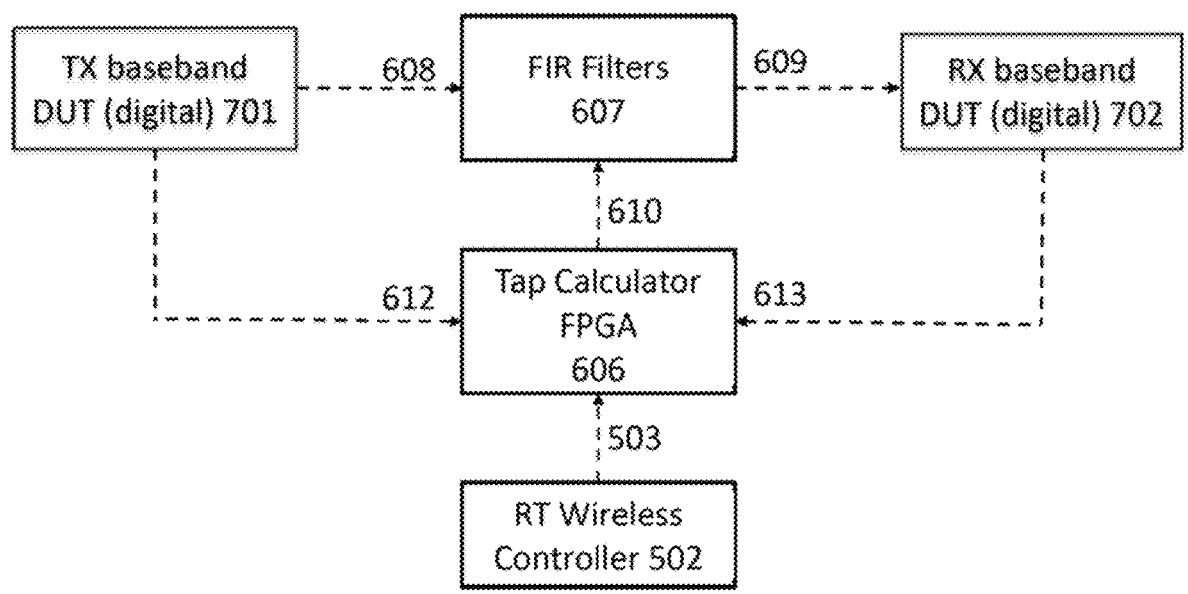

FIG. 7(a) illustrates a block diagram of another exemplary embodiment of the wireless emulator according to the present disclosure which is based on FPGAs, where the TX and RX DUTs are located in the same chassis as the wireless emulator. Its various constituents are described below, and the data flow between the various components is illustrated in FIG. 7(b). There are several differences between this exemplary embodiment and the exemplary embodiment described above with reference to FIGS. 6(a) and 6(b). First, e.g., TX-shim 603 and TX baseband DUT 201 are replaced by a single block, the TX baseband DUT (digital), shown as block 701. This block 701 can be substantially similar to block 201, except that instead of sending out analog signal 202, it directly sends out digital baseband signal 608. Similarly, RX-shim 604 and RX baseband DUT 301 can be replaced by a single block, the RX baseband DUT (digital), shown as block 702. This block 702 can be substantially similar to block 301, except that instead of receiving analog signal 202, it receives digital baseband signal 609.

In other exemplary embodiments, the reference designs shown in FIGS. 6(a) and 6(b) and FIGS. 7(a) and 7(b) can be modified in various ways including, e.g., one or more of the following: a) there are more than two DUTs that communicate with the emulator; b) the DUTs can be full-duplex, meaning that a DUT can have both a TX and an RX component; c) a subset of DUTs are located inside the wireless emulator, and the remainder of the DUTs are located outside the wireless emulator. Further, as previously indicated, the emulator can be configured such that the TX and RX DUTs use different beamforming modes.

For example, a wireless link with $N_{TX}$ and $N_{RX}$ antennas at the TX and RX respectively, can be employed. The main exemplary equation that expresses the samples at the RX antennas, as a function of the samples at the TX antennas is shown (1) below:

$$y_k = \sum_{l=1}^{L} g_l(k) v_{l(RX)} v_{l(TX)}^* x_{k-\tau_l} \quad (1)$$

where:
k: Current time, or sample index.
$y_k$: Samples at the receiver antennas at time ($N_{RX} \times 1$).
L: Number of paths in the multipath profile.
$v_{l(RX)}$: Spatial signature of the $l^{th}$ path at the receiver. ($N_{RX} \times 1$).
$v_{l(TX)}$: Spatial signature of the $l^{th}$ path at the transmitter. ($N_{TX} \times 1$).
$\tau_l$: Delay of the $l^{th}$ multipath component.
$x_{k-\tau_l}$: Samples at the transmit antennas at time k-$\tau_l$. ($N_{TX} \times 1$).
$g_l(k)$: Small-scale fading coefficient of the $l^{th}$ multipath component at time k. This is a scalar.

As illustrated in (1), the overall channel function (for each path) is a matrix of dimension ($N_{RX} \times N_{TX}$); this channel function can be applied to the input $x_k$ of size ($N_{TX} \times 1$) to yield the output $y_k$ of size ($N_{RX} \times 1$). Given that $N_{TX}$ and $N_{RX}$ can be quite large, this ($N_{RX} \times N_{TX}$) channel can be extremely computationally expensive for prior-art channel emulators to emulate. However, various exemplary embodiments of the present disclosure can improve the efficiency of the wireless emulator, including the efficiency of the calculations performed by the tap calculator, as described below.

In the various exemplary embodiments for emulation of analog beamforming, described herein, the user-level transmitted data from the TX DUT (signal 202) is a single stream $u_k$, and the user-level received data by the RX DUT (signal 302) is a single stream $z_k$. The beamforming vector at the TX $w_{TX}$ is of size ($N_{TX} \times 1$), and the beamforming vector at the RX $w_{RX}$ is of size ($N_{RX} \times 1$). The signal at the TX antennas is given by $x_k = w_{TX} u_k$. Similarly, the signal at the RX antennas $y_k$ is converted to the user-level single stream $z_k$ using the relationship $z_k = w^*_{RX} y_k$. Substituting these values into (1) and simplifying yields:

$$z_k = \sum_{l=1}^{L} g_l(k)(w^*_{RX} v_{l(RX)})(v^*_{l(TX)} w_{TX}) u_{k-\tau_l}. \quad (2)$$

By using the following relationship, $$f_l = w_{RX}^* v_{l(RX)})(v_{l(TX)}^* w_{TX}) \quad (3)$$

Equation (2) can be simplified to (4) below, which represents the relationship between the input $u_k$ on signal 202 and output $z_k$ on signal 302:

$$z_k = \sum_{l=1}^{L} g_l(k) f_l u_{k-\tau_l}. \quad (4)$$

Figure 8A:
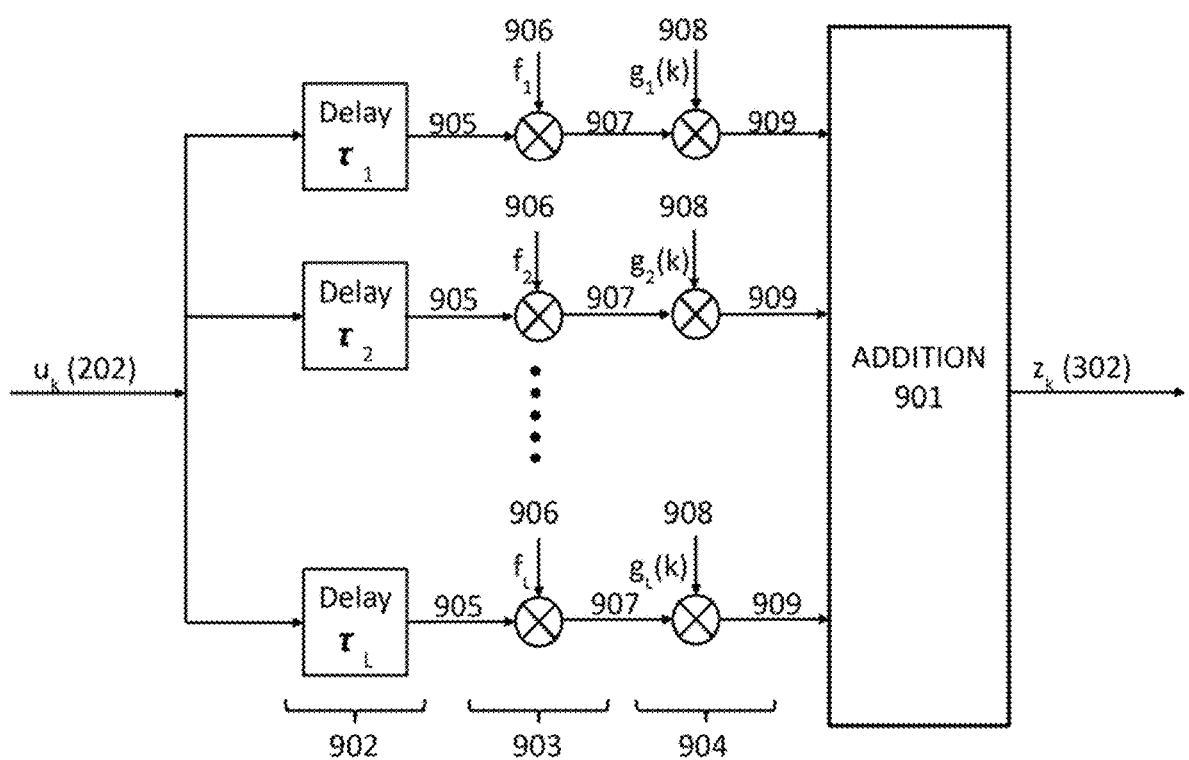
FIG. 8(a) is a block diagram of an exemplary FIR filter used in one or more exemplary embodiments of the present disclosure that utilize analog beamforming.

This emulated multi-path profile comprises L paths, each with a complex gain and an associated delay. FIG. 8(a) illustrates a block diagram of the FIR filters 607 used to emulate these L paths, each comprising the following blocks:

Block 902: Delays the input signal 202 to create signal 905

Block 903: Performs a complex multiplication of scalar signal 905 with scalar $f_l$ (signal 906) to create signal 907;

Block 904: Performs a complex multiplication of scalar signal 907 with scalar $g_l(k)$ (signal 908) to create signal 909;

Block 901: Performs a complex addition of the scalar signals 909 from each of the L paths.

In addition, tap calculator 606 can be configured according to (3) to calculate the scalar which is transmitted to the block 607 as the input signal 906.

In the various exemplary embodiments for emulation of hybrid beamforming, described above, the user-level transmitted data from the TX DUT (signal 202) is an m-ary stream $u_k$, and the user-level received data by the RX DUT (signal 302) is an m-ary stream $z_k$. The TX beamforming matrix $W_{TX}$ is of size ($N_{TX} \times m$), and the RX beamforming matrix $W_{RX}$ is of size ($N_{RX} \times m$). Therefore, the signal at the TX antennas is given by $x_k = W_{TX} u_k$. Similarly, the signal at the RX antennas $y_k$ is converted to the user-level m-ary stream $z_k$ using the relationship $z_k = W^*_{RX} y_k$. Substituting these values into (1) yields:

$$z_k = \sum_{l=1}^{L} g_l(k)(W^*_{RX} v_{l(RX)})(v^*_{l(TX)} W_{TX}) u_{k-\tau_l}. \quad (5)$$

By applying the following two relationships, $$f_{l(RX)} = (W_{RX}^* v_{l(RX)}), \quad (6)$$

$$f_l(v_{l(TX)}^* W_{TX}) \quad (7)$$

Figure 8B:
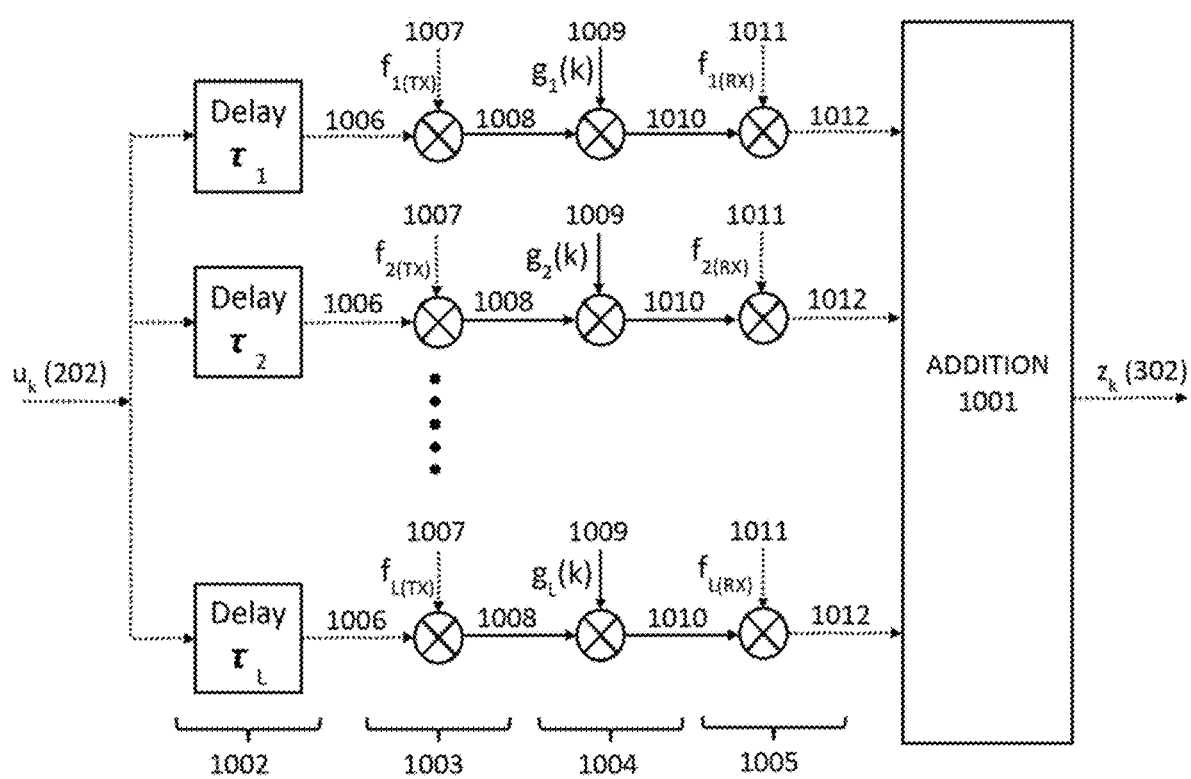
FIG. 8(b) is a block diagram of an exemplary FIR filter used in one or more exemplary embodiments of the present disclosure that utilize hybrid beamforming.

Equation (5) can be simplified to $$z_k = \sum_{l=1}^{L} g_l(k) f_{l(RX)} f_{l(TX)} u_{k-\tau_l}, \quad (8)$$

which represents the relationship between the m-ary input $u_k$ on signal 202 and the m-ary output $z_k$ on signal 302. FIG. 8(b) illustrates a block diagram of the FIR filters 607 used to emulate these L paths of (8), each comprising the following blocks:

Block 1002: Delays the m-ary input signal 202 to create signal 1006;

Block 1003: Performs a complex multiplication of the m-ary signal 1006 with the m-ary $f_{l(TX)}$ (signal 1007) to create a scalar output 1008;

Block 1004: Performs a complex multiplication of scalar signal 1008 with scalar $g_l(k)$ (signal 1009) to create scalar output 1010;

Block 1005: Performs a complex multiplication of scalar signal 1010 with m-ary $f_{l(RX)}$ (signal 1011) to create m-ary output signal 1012; and Block 1001: Performs a complex addition of the m-ary signals 1012 from each of the L paths to create output m-ary signal 302.

In addition, tap calculator 606 is configured according to (6)-(7) to calculate $f_{l(RX)}$ and $f_{l(TX)}$ respectively; these values are transmitted to block 607 as signals 1011 and 1007, respectively.

In the various exemplary embodiments for emulation of digital beamforming, described-herein, the user-level transmitted data from the TX DUT (signal 202) comprises an $N_{TX}$-ary stream $u_k$, and the user-level received data by the RX DUT (signal 302) comprises an $N_{RX}$-ary stream $z_k$. In such exemplary embodiments, the DUTs in question perform the beamforming; there are no beamforming vectors/matrices that they share with the wireless emulator. Accordingly, the channel to be emulated is simply given by:

$$z_k = \sum_{l=1}^{L} g_l(k) v_{l(RX)} v^*_{l(TX)} u_{k-\tau_l}. \quad (9)$$

By applying the following two relationships, $$f_{l(TX)} = v_{l(TX)}^*, \quad (10)$$

$$f_{l(RX)} = v_{l(RX)} \quad (11)$$

Equation (9) can be simplified to the following, which represents the relationship between the $N_{TX}$-ary input $u_k$ on signal 202 and the $N_{RX}$-ary output $z_k$ on signal 302:

$$z_k = \sum_{l=1}^{L} g_l(k) f_{l(RX)} f_{l(TX)} u_{k-\tau_l}. \quad (12)$$

Figure 8C:
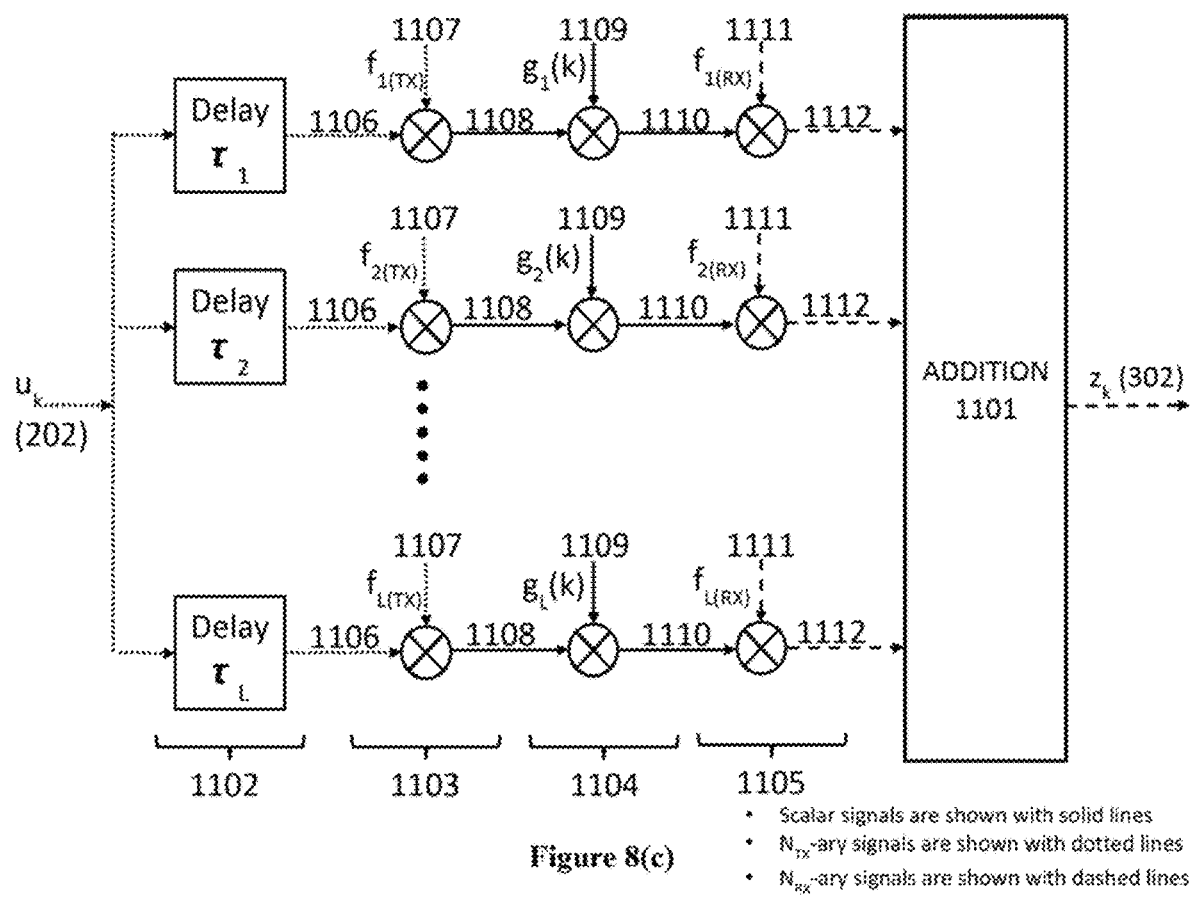
FIG. 8(c) is a block diagram of an exemplary FIR filter used in one or more exemplary embodiments of the present disclosure that utilize digital beamforming.

FIG. 8(c) illustrates a block diagram of the FIR filters 607 used to emulate these L paths of (12) according to an exemplary embodiment of the present disclosure, each comprising the following blocks:

Block 1102: Delays the $N_{TX}$-ary input signal 202 to create signal 1106;

Block 1103: Performs a complex multiplication of the $N_{TX}$-ary signal 1106 with the $N_{TX}$-ary $f_{l(TX)}$ (signal 1107) to create a scalar output 1108;

Block 1104: Performs a complex multiplication of scalar signal 1108 with scalar $g_l(k)$ (signal 1109) to create scalar output 1110;

Block 1105: Performs a complex multiplication of scalar signal 1110 with $N_{RX}$-ary $f_{l(RX)}$ (signal 1111) to create $N_{RX}$-ary output signal 1112; and Block 1101: Performs a complex addition of the $N_{RX}$-ary signals 1112 from each of the L paths to create output $N_{RX}$-ary signal 302.

In addition, tap calculator 606 is configured according to (10)-(11) to calculate $f_{l(RX)}$ and $f_{l(TX)}$ respectively; these values are transmitted to block 607 as signals 1007 and 1011, respectively.

As discussed herein, the wireless emulator can be employed to emulate different (e.g., heterogeneous) beamforming techniques of the TX and RX DUTs. Although any combination of TX and RX beamforming techniques can be emulated, an exemplary embodiment in which TX DUT employs analog beamforming and the RX DUT employs digital beamforming is described below. Persons of ordinary skill will readily comprehend that similar techniques and calculations, such as those shown below, can be employed for other permutations of emulated beamforming techniques applied to the DUTs.

In the exemplary heterogeneous beamforming configuration according to an exemplary embodiment of the present disclosure, the user-level data from the TX DUT (signal 202) is a single stream $u_k$, and the user-level received data by the RX DUT (signal 302) is an $N_{RX}$-ary stream $z_k$. The beamforming vector at the TX $w_{TX}$ is of size ($N_{TX} \times 1$), and there is no beamforming vector or matrix at the receiver. Therefore, the signal at the TX antennas is given by $x_k = w_{TX} u_k$. In this exemplary embodiment, the relationship between the signal at the TX and RX antennas is:

$$z_k = y_k = \sum_{l=1}^{L} g_l(k) v_{l(RX)} v_{l(TX)}^* w_{TX} u_{k-\tau_l}, \quad (13)$$

where the equivalent channel $f_l$ is a vector of size ($N_{RX} \times 1$) given by:

$$f_l = v_{l(RX)} v_{l(TX)}^* w_{TX}. \quad (14)$$

Combining (13) and (14) results in the following, which represents the relationship between the user-level transmitted data $u_k$ and the user-level received data $z_k$:

$$z_k = y_k = \sum_{l=1}^{L} g_l(k) f_l u_{k-\tau_l}, \quad (15)$$

Figure 8D:
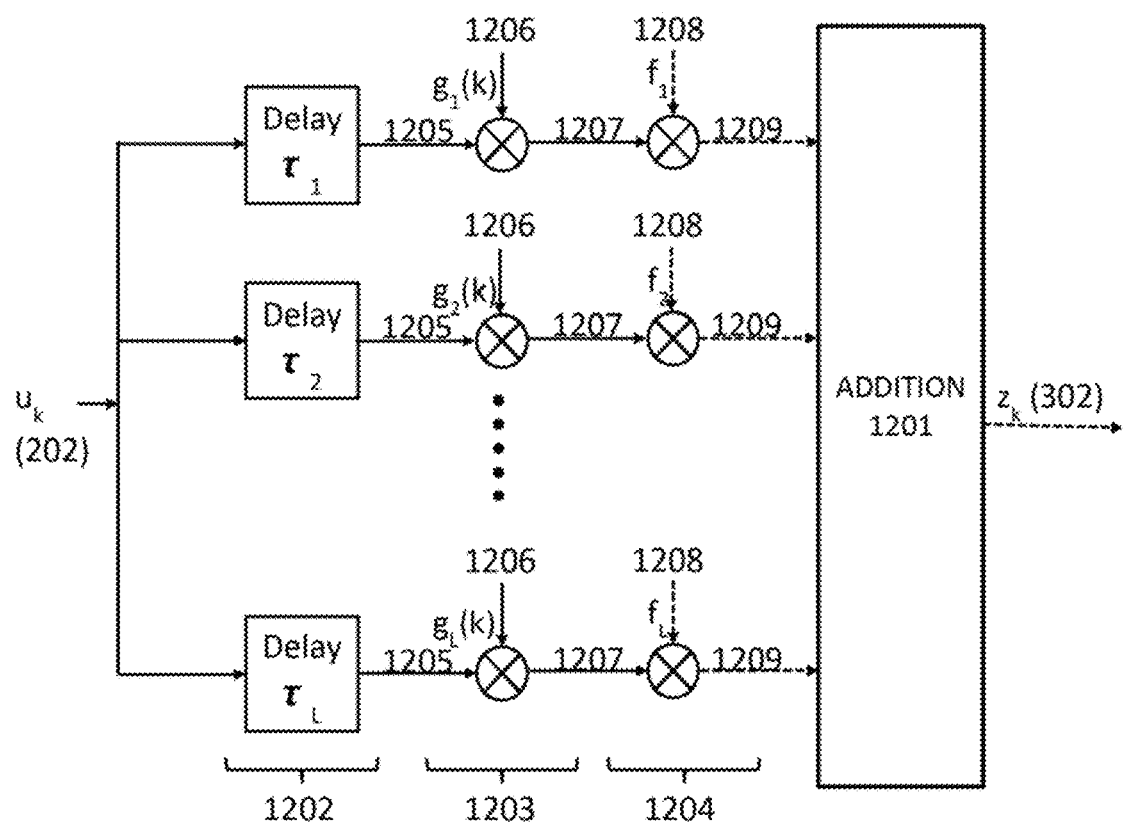
FIG. 8(d) is a diagram of an exemplary FIR filter used in one or more exemplary embodiments of the present disclosure that utilize heterogeneous beamforming.

FIG. 8(d) illustrates a block diagram of the FIR filters 607 used to emulate these L paths of (15) according to an exemplary embodiment of the present disclosure, each comprising the following blocks:

Block 1202: Delays the single stream input signal 202 to create signal 1205;

Block 1203: Performs a complex multiplication of the scalar signal 1205 with the scalar $g_l(k)$ (signal 1206) to create scalar output signal 1207;

Block 1204: Performs a complex multiplication of scalar stream 1207 with the $N_{RX}$-ary stream $f_l$ (signal 1208) to create $N_{RX}$-ary stream signal 1209; and Block 1201: Performs a complex addition of the $N_{RX}$-ary signals 1209 from each of the L paths to create NRX-ary signal 302.

In addition, tap calculator 606 is configured according to (14) to calculate $f_l$, which is transmitted to block 607 as signal 1208.

In various exemplary embodiments, FIR block 607 can also be configured to calculate a short-scale fading parameter $g_l(k)$ shown in various equations above. This parameter can be calculated by FIR block 607 as it typically changes more rapidly (e.g., every clock cycle) than the rate of change of the equivalent channel taps (which are calculated periodically by the tap calculator). Short-scale fading parameter $g_l(k)$ is essentially a rotating phasor, and can be implemented by the wireless emulator by using, e.g., a numerically controlled oscillator (NCO). For example, FIR block 607 can be configured to calculate a frequency and/or phase used to configured the NCO.

Although various embodiments are described herein above as a combination of processing blocks, the person of ordinary skill will readily comprehend that such processing blocks can be embodied by various combinations of hardware and software in various systems, computing devices, control devices, apparatuses, non-transitory computer-readable media, etc. Moreover, as described herein, a device or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. A device or apparatus can be regarded as a device or apparatus, or as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that prior art knowledge has not been explicitly incorporated by reference herein above, it is explicitly incorporated herein in its entirety.

What is claimed is:

1. A device for emulation of a system which includes a wireless channel, a wireless transmitter, and a wireless receiver, the device comprising:
an emulation processor configured to receive baseband data, process the received baseband data, and transmit the processed baseband data, in substantially real-time operation; and
a controller configured to:
configure the emulation processor according to configuration information which pertains to the wireless channel, the wireless transmitter and the wireless receiver to be emulated, and
process the received baseband data according to the configuration information comprising first parameters relating to the wireless channel and second parameters relating to one or more antennas coupled to at least one of the wireless transmitter or the wireless receiver,
wherein the second parameters relating to the plurality of antennas comprise at least one of gain patterns, placements, orientations, beamforming weights, or precoding matrices.

2. The device of claim 1, wherein at least one portion of the configuration information pertaining to at least one of the wireless transmitter and the wireless receiver is received from one or more devices under test (DUTs).

3. The device of claim 1, wherein the configuration information pertaining to at least one of the wireless transmitter and the wireless receiver comprises data relating to at least one of (i) beamforming weights or precoding matrices for a plurality of antennas, (ii) gain control or polarization for one or more of the antennas, or (iii) a placement or an orientation for one or more the antennas.

4. The device of claim 3, wherein the configuration information pertaining to the wireless transmitter relates to analog beamforming and the configuration information pertaining to the wireless receiver relates to at least one of (i) analog beamforming or (ii) digital beamforming.

5. The device of claim 3, wherein the configuration information pertaining to the wireless transmitter relates to digital beamforming and the configuration information pertaining to the wireless receiver relates to at least one of (i) analog beamforming or (ii) digital beamforming.

6. The device of claim 3, wherein the configuration information pertaining to the wireless transmitter relates to hybrid beamforming and the configuration information pertaining to the wireless receiver relates to at least one of (i) analog beamforming or (ii) digital beamforming.

7. The device of claim 3, wherein the configuration information pertaining to the wireless transmitter relates to analog beamforming and the configuration information pertaining to the wireless receiver relates to hybrid beamforming.

8. The device of claim 3, wherein the configuration information pertaining to the wireless transmitter relates to digital beamforming and the configuration information pertaining to the wireless receiver relates to hybrid beamforming.

9. The device of claim 3, wherein the configuration information pertaining to the wireless transmitter relates to hybrid beamforming and the configuration information pertaining to the wireless receiver relates to hybrid beamforming.

10. The device of claim 1, wherein the configuration information pertaining to the wireless channel comprises parameters relating to a channel impulse response.

11. The device of claim 1, wherein the configuration information pertaining to the wireless channel comprises parameters relating to a mobility of at least one of the wireless transmitter or the wireless receiver.

12. The device of claim 1, wherein the emulation processor comprises a plurality of programmable finite impulse response (FIR) filters.

13. The device of claim 1, wherein updated configuration information pertaining to one or more of the wireless channel, the wireless transmitter, and the wireless receiver is received; and wherein the controller is further configured to configure the emulation processor to operate according to the received updated configuration without substantially affecting the substantially real-time operation.

14. The device of claim 13, wherein the controller is further configured to configure the emulation controller in response to the updated configuration information.

15. A device for emulation of a system which includes a wireless channel, a wireless transmitter, and a wireless receiver, the device comprising:
an emulation processor configured to receive baseband data, process the received baseband data, and transmit the processed baseband data, in substantially real-time operation; and
a controller configured to:
configure the emulation processor according to configuration information which pertains to the wireless channel, the wireless transmitter and the wireless receiver to be emulated,
wherein the emulation processor comprises a plurality of programmable finite impulse response (FIR) filters, and
wherein the controller is configured to program the plurality of programmable FIR filters based on:
one or more spatial signatures relating to a plurality of paths comprising the wireless channel; and
one or more beamforming matrices relating to at least one of the wireless transmitter or the wireless receiver.

16. The device of claim 15, wherein the controller is configured to program the plurality of programmable FIR filters to emulate at least one of (i) a multiple-input, multiple output (MIMO) channel or (ii) emulate a single-input, single-output (SISO) channel for each of the plurality of paths comprising the wireless channel.

17. A method for emulation of a system which includes a wireless channel, a wireless transmitter, and a wireless receiver, the method comprising:
receiving, with an emulation processor, baseband data, processing the received baseband data, and transmitting the processed baseband data, in substantially real-time operation;
receiving configuration information pertaining to one or more of the wireless channel, the wireless transmitter, and the wireless receiver to be emulated;
configuring the emulation processor according to the received configuration information; and
processing the received baseband data according to the configuration information comprising first parameters relating to the wireless channel and second parameters relating to one or more antennas comprising at least one of the wireless transmitter or the wireless receiver,
wherein the parameters relating to the plurality of antennas comprise at least one of gain patterns, placements, orientations, beamforming weights, or precoding matrices.

18. A device for emulation of a system which includes a wireless channel, a wireless transmitter, and a wireless receiver, the device comprising:
an emulation processor configured to receive baseband data, process the received baseband data, and transmit the processed baseband data, in substantially real-time operation; and
a controller configured to:
configure the emulation processor according to configuration information which pertains to the wireless channel, the wireless transmitter and the wireless receiver to be emulated,
wherein the configuration information pertaining to at least one of the wireless transmitter and the wireless receiver comprises data relating to at least one of (i) beamforming weights or precoding matrices for a plurality of antennas, (ii) gain control or polarization for one or more of the antennas, or (iii) a placement or an orientation for one or more the antennas,
wherein the configuration information pertaining to the wireless transmitter relates to at least one of (i) analog beamforming, (ii) digital beam forming, or (iii) hybrid beamforming, and
wherein the configuration information pertaining to the wireless receiver relates to at least one of (i) analog beamforming, (ii) digital beamforming, or (iii) hybrid beamforming.

19. A method for emulation of a system which includes a wireless channel, a wireless transmitter, and a wireless receiver, the method comprising:
receiving, with an emulation processor, baseband data, processing the received baseband data, and transmitting the processed baseband data, in substantially real-time operation, wherein the emulation processor comprises a plurality of programmable finite impulse response (FIR) filters;
receiving configuration information pertaining to one or more of the wireless channel, the wireless transmitter, and the wireless receiver to be emulated;
configuring the emulation processor according to the received configuration information; and
programming the plurality of programmable FIR filters based on:
one or more spatial signatures relating to a plurality of paths comprising the wireless channel; and
one or more beamforming matrices relating to at least one of the wireless transmitter or the wireless receiver.

20. A method for emulation of a system which includes a wireless channel, a wireless transmitter, and a wireless receiver, the method comprising:
receiving, with an emulation processor, baseband data, processing the received baseband data, and transmitting the processed baseband data, in substantially real-time operation;
receiving configuration information pertaining to one or more of the wireless channel, the wireless transmitter, and the wireless receiver to be emulated; and
configuring the emulation processor according to the received configuration information,
wherein the configuration information pertaining to at least one of the wireless transmitter and the wireless receiver comprises data relating to at least one of (i) beamforming weights or precoding matrices for a plurality of antennas, (ii) gain control or polarization for one or more of the antennas, or (iii) a placement or an orientation for one or more the antennas,
wherein the configuration information pertaining to the wireless transmitter relates to at least one of (i) analog beamforming, (ii) digital beam forming, or (iii) hybrid beamforming, and
wherein the configuration information pertaining to the wireless receiver relates to at least one of (i) analog beamforming, (ii) digital beamforming, or (iii) hybrid beamforming.

* * * * *